(12) United States Patent
Matono

(10) Patent No.: US 7,492,551 B2
(45) Date of Patent: Feb. 17, 2009

(54) THIN FILM MAGNETIC HEAD, METHOD OF MANUFACTURING THE SAME, AND MAGNETIC RECORDING APPARATUS

(75) Inventor: Naoto Matono, Saku (JP)

(73) Assignee: SAE Magnetics (H.K.) Ltd., Shatin, N.T. (HK)

( * ) Notice: Subject to any disclaimer, the term of this patent is extended or adjusted under 35 U.S.C. 154(b) by 557 days.

(21) Appl. No.: 10/841,910

(22) Filed: May 6, 2004

(65) Prior Publication Data

US 2004/0240110 A1  Dec. 2, 2004

(30) Foreign Application Priority Data

May 9, 2003  (JP) .............. 2003-132126

(51) Int. Cl.
*G11B 5/31* (2006.01)
*G11B 5/39* (2006.01)

(52) U.S. Cl. .............. 360/125.17; 360/125.22; 360/125.04; 360/125.06

(58) Field of Classification Search .......... 360/126, 360/125.17, 125.22, 125.23
See application file for complete search history.

(56) References Cited

U.S. PATENT DOCUMENTS

| | | | | |
|---|---|---|---|---|
| 5,801,910 A | * | 9/1998 | Mallary | 360/126 |
| 6,480,355 B1 | * | 11/2002 | Kamijima | 360/126 |
| 6,728,064 B2 | * | 4/2004 | Sato et al. | 360/126 |
| 6,754,049 B1 | * | 6/2004 | Seagle et al. | 360/317 |
| 6,850,390 B2 | * | 2/2005 | Sato et al. | 360/126 |
| 2001/0027603 A1 | * | 10/2001 | Komuro et al. | 29/603.14 |
| 2001/0043445 A1 | * | 11/2001 | Nishida et al. | 360/317 |
| 2003/0189787 A1 | * | 10/2003 | Matono et al. | 360/126 |

* cited by examiner

*Primary Examiner*—Andrea L Wellington
*Assistant Examiner*—Matthew G Kayrish
(74) *Attorney, Agent, or Firm*—Kenyon & Kenyon LLP

(57) ABSTRACT

The present invention provides a thin film magnetic head achieving improved recording performance by sharpening recording magnetic field gradient as much as possible. The thin film magnetic head has a return yoke layer disposed on a trailing side of a magnetic pole layer, and width W3 of an exposed surface of a lower TH specifying part in a TH specifying portion in the return yoke layer is equal to or larger than width W1 of an exposed surface of the magnetic pole layer (W3☐W1), and is less than width W4 of an exposed surface of an upper TH specifying part (W3<W4). Since a part (magnetic flux) of a magnetic flux emitted from the exposed surface to the outside flows in the exposed surface while being spread a little in the width direction, spread of the magnetic flux is suppressed at the time of recording. Therefore, the recording magnetic field gradient near an air bearing surface is sharpened and recording performance is improved.

12 Claims, 19 Drawing Sheets

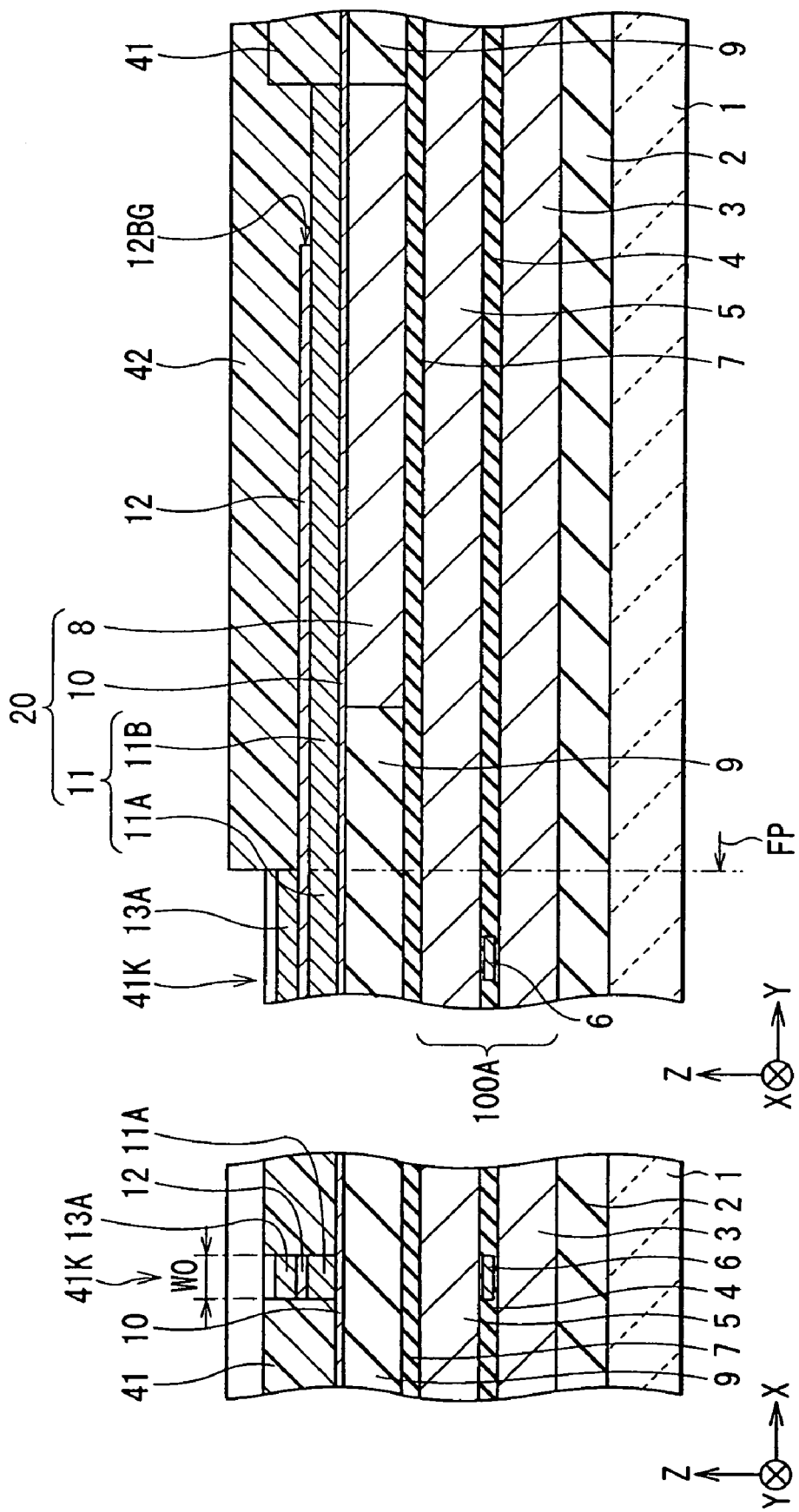

THIN FILM MAGNETIC HEAD, METHOD OF MANUFACTURING THE SAME, AND MAGNETIC RECORDING APPARATUS

BACKGROUND OF THE INVENTION

1. Field of the Invention

The present invention relates to a thin film magnetic head having at least an inductive magnetic transducer for recording, a method of manufacturing the same, and a magnetic recording apparatus in which a thin film magnetic head is mounted.

2. Description of the Related Art

In recent years, a magnetic recording apparatus typified by, for example, a hard disk drive is being widely spread. In the field of development of the hard disk drive, in association with improvement in surface recording density of a hard disk as the magnetic recording medium (herein below, simply called "recording medium"), improvement in performance of a thin film magnetic head is demanded. Known recording methods of a thin film magnetic head are a longitudinal recording method in which the orientation of a signal magnetic field is set to an in-plane direction (longitudinal direction) of a recording medium and a perpendicular recording method in which the orientation of a signal magnetic field is set to a direction orthogonal to the surface of a recording medium. At present, the longitudinal recording method is widely used. However, when a market trend accompanying improvement in surface recording density is considered, it is assumed that, in place of the longitudinal recording method, the perpendicular recording method will be regarded as a promising method in future for the following reason. The perpendicular recording method has advantages such that high linear recording density can be assured and a recorded recording medium is not easily influenced by thermal fluctuations.

The main part of a thin film magnetic head of the perpendicular recording method has, for example, a thin film coil for generating a magnetic flux, a magnetic pole layer for executing a recording process by emitting the magnetic flux generated by the thin film coil toward a recording medium, and a return yoke layer for returning the magnetic flux emitted from the magnetic pole layer and magnetized the recording medium.

As thin film magnetic heads of this kind, for example, some thin film magnetic heads in each of which a return yoke layer is disposed on a trailing side of the magnetic pole layer are known (for example, refer to U.S. Pat. No. 4,656,546 and Japanese Unexamined Patent Application Nos. Hei05-325137, Hei06-236526, and 2003-045008). In the thin film magnetic heads, mainly, when a magnetic flux is generated, a part of the magnetic flux emitted from a portion around an edge on the trailing side of the magnetic pole layer, that is, spread components of the magnetic flux to the periphery flow into the return yoke layer, so that spread of the magnetic flux is suppressed. Therefore, in the thin film magnetic heads, as compared with a thin film magnetic head which does not have the return yoke layer, the recording magnetic field gradient near a recording-medium-facing surface (air bearing surface) is sharper, so that an advantage of improved S/N (Signal to Noise) ratio is obtained.

Another example of the known thin film magnetic head in which the return yoke layer is disposed on the trailing side of the magnetic pole layer is a thin film magnetic head in which a portion facing the magnetic pole layer of the return yoke layer is partly projected to the magnetic pole layer side (refer to, for example, Japanese Unexamined Patent Application No. 2002-092820). The thin film magnetic head has an advantage of reduced track edge noise since spread of a magnetic flux emitted from the magnetic pole layer in the track width direction is suppressed when the magnetic flux is returned via the recording medium to the return yoke layer.

To improve recording performance of a thin film magnetic head of the perpendicular recording method, for example, it is necessary to suppress spread of the magnetic flux at the time of recording and to sharpen the gradient of a recording magnetic field as much as possible near the air bearing surface. With respect to this point, for example, the above-described thin film magnetic head in which a part of the return yoke layer is partly projected is very useful. However, considering expected future needs for further improvement in recording performance, it can be said that the configuration of the thin film magnetic head still has room for improvement. In particular, when mass productivity of the thin film magnetic head is considered, it is desired not only to seek a configuration of a thin film magnetic head of which recording performance is expected to be improved but also to establish a concrete manufacturing method capable of mass-producing the thin film magnetic head.

SUMMARY OF THE INVENTION

The present invention has been achieved in consideration of such problems and its first object is to provide a thin film magnetic head realizing improved recording performance by sharpening the gradient of a recording magnetic field as much as possible.

A second object of the invention is to provide a thin film magnetic head manufacturing method capable of stably and easily manufacturing a thin film magnetic head of the invention by using an existing manufacturing process.

A third object of the invention is to provide a magnetic recording apparatus in which a thin film magnetic head of the invention is mounted.

A thin film magnetic head according to a first aspect of the invention comprises: a magnetic pole layer having a uniform-width portion which extends rearward from a recording-medium-facing surface which faces a recording medium traveling in a medium travel direction while maintaining a uniform width; a main return magnetic pole layer which extends rearward from the recording-medium-facing surface on the side of the medium travel direction of the magnetic pole layer and is coupled to the magnetic pole layer in its rear end region; and a sub-return magnetic pole layer which is isolated from the magnetic pole layer by a gap layer, is coupled to the main return magnetic pole layer, and extends from the recording-medium-facing surface to a predetermined rearward position in a region between the gap layer and the main return magnetic pole layer. A portion corresponding to the uniform-width portion in the sub-return magnetic pole layer is projected toward the uniform-width portion and is in contact with the gap layer.

A thin film magnetic head according to a second aspect of the invention comprises: a magnetic pole layer including a uniform-width portion which extends rearward from a recording-medium-facing surface which faces a recording medium traveling in a medium travel direction while maintaining a uniform width; a main return magnetic pole layer which extends rearward from the recording-medium-facing surface on the side of the medium travel direction of the magnetic pole layer and is coupled to the magnetic pole layer in its rear end region; and a sub-return magnetic pole layer which is isolated from the magnetic pole layer by a gap layer, is coupled to the main return magnetic pole layer, and extends from the recording-medium-facing surface to a predetermined rearward position in a region between the gap layer and the main return magnetic pole layer. The uniform-width portion has a magnetic pole end surface exposed in the recording-medium-facing surface, the sub-return magnetic pole layer has a configuration in which a first sub-return magnetic pole layer portion having a first sub-return magnetic pole end surface exposed in the recording-medium-facing surface and a second sub-return magnetic pole layer portion having a second sub-return magnetic pole end surface exposed in the recording medium facing surface are stacked in order from the side close to the uniform-width portion, and width of the first sub-return magnetic pole end surface is equal to or larger than width of the magnetic pole end surface and is less than width of the second sub-return magnetic pole end surface.

A method according to a first aspect of the invention is a method for manufacturing a thin film magnetic head comprising: a magnetic pole layer having a uniform-width portion which extends rearward from a recording-medium-facing surface which faces a recording medium traveling in a medium travel direction while maintaining a uniform width; a main return magnetic pole layer which extends rearward from the recording-medium-facing surface on the side of the medium travel direction of the magnetic pole layer and is coupled to the magnetic pole layer in its rear end region; and a sub-return magnetic pole layer which is isolated from the magnetic pole layer by a gap layer, is coupled to the main return magnetic pole layer, and extends from the recording-medium-facing surface to a predetermined rearward position in a region between the gap layer and the main return magnetic pole layer. A portion corresponding to the uniform-width portion in the sub-return magnetic pole layer is projected toward the uniform-width portion and is in contact with the gap layer.

A method according to a second aspect of the invention is a method of manufacturing a thin film magnetic head comprising: a magnetic pole layer having a uniform-width portion which extends rearward from a recording-medium-facing surface which faces a recording medium traveling in a medium travel direction while maintaining a uniform width; a main return magnetic pole layer which extends rearward from the recording-medium-facing surface on the side of the medium travel direction of the magnetic pole layer and is coupled to the magnetic pole layer in its rear end region; and a sub-return magnetic pole layer which is isolated from the magnetic pole layer by a gap layer, is coupled to the main return magnetic pole layer, and extends from the recording-medium-facing surface to a predetermined rearward position in a region between the gap layer and the main return magnetic pole layer. The method comprises: a first step of forming a first photoresist pattern having an opening region corresponding to a plane shape of the magnetic pole layer; a second step of pattern forming the magnetic pole layer including the uniform-width portion in the opening region of the first photoresist pattern; a third step of pattern forming the gap layer on the magnetic pole layer in the opening region of the first photoresist pattern; a fourth step of forming a second photoresist pattern so as to cover the first photoresist pattern and the opening region in a region rearward of a region in which the sub-return magnetic pole layer is formed; a fifth step of pattern forming a first sub-return magnetic pole layer portion as a part of the sub-return magnetic pole layer on the gap layer in a region surrounded by the first and second photoresist patterns in the opening region of the first photoresist pattern; a sixth step of removing the first and second photoresist patterns; a seventh step of forming an insulating layer so as to cover the magnetic pole layer, the gap layer, the first sub-return magnetic pole layer portion, and their peripheral regions; an eighth step of planarizing the first sub-return magnetic pole layer portion and the insulating layer by polishing the insulating layer until at least the first sub-return magnetic pole layer portion is exposed; a ninth step of pattern forming a second sub-return magnetic pole layer portion as another part of the sub-return magnetic pole layer on the first sub-return magnetic pole layer portion, thereby forming the sub-return magnetic pole layer including the first and second sub-return magnetic pole layer portions; and a tenth step of forming the recording-medium-facing surface, thereby forming a magnetic pole end surface exposed in the recording-medium-facing surface of the uniform-width portion, a first sub-return magnetic pole end surface exposed in the recording-medium-facing surface of the first sub-return magnetic pole layer portion, and a second sub-return magnetic pole end surface exposed in the recording-medium-facing surface of the second sub-return magnetic pole layer portion. Width of the first sub-return magnetic pole end surface is equal to or larger than width of the magnetic pole end surface and is less than width of the second sub-return magnetic pole end surface.

A magnetic recording apparatus according to a first aspect of the invention comprises a recording medium and a thin film magnetic head for magnetically recording information onto the recording medium. The thin film magnetic head comprises: a magnetic pole layer having a uniform-width portion which extends from a recording-medium-facing surface which faces a recording medium traveling in a medium travel direction while maintaining a uniform width; a main return magnetic pole layer which extends rearward from the recording-medium-facing surface on the side of the medium travel direction of the magnetic pole layer and is coupled to the magnetic pole layer in its rear end region; and a sub-return magnetic pole layer which is isolated from the magnetic pole layer by a gap layer, is coupled to the main return magnetic pole layer, and extends from the recording-medium-facing surface to a predetermined rearward position in a region between the gap layer and the main return magnetic pole layer. A portion corresponding to the uniform-width portion in the sub-return magnetic pole layer is projected toward the uniform-width portion and is in contact with the gap layer.

A magnetic recording apparatus according to a second aspect of the invention comprises a recording medium and a thin film magnetic head for magnetically recording information onto the recording medium. The thin film magnetic head comprises: a magnetic pole layer having a uniform-width portion which extends rearward from a recording-medium-facing surface which faces a recording medium traveling in a medium travel direction while maintaining a uniform width; a main return magnetic pole layer which extends rearward from the recording-medium-facing surface on the side of the medium travel direction of the magnetic pole layer and is coupled to the magnetic pole layer in its rear end region; and a sub-return return magnetic pole layer which is isolated from the magnetic pole layer by a gap layer, is coupled to the main return magnetic pole layer, and extends from the recording-medium-facing surface to a predetermined rearward position in a region between the gap layer and the main return magnetic pole layer. The uniform-width portion has a magnetic pole end surface exposed in the recording-medium-facing surface. The sub-return magnetic pole layer has a configuration in which a first sub-return magnetic pole layer portion having a first sub-return magnetic pole end surface exposed in the recording-medium-facing surface and a second sub-return magnetic pole layer portion having a second sub-return magnetic pole end surface exposed in the recording-medium-facing surface are stacked in order from the side close to the uniform-width portion, and width of the first sub-return magnetic pole end surface is equal to or larger than width of the magnetic pole end surface and is less than width of the second sub-return magnetic pole end surface.

The "side of the medium travel direction" is a side of outflow of a recording medium when a traveling state of the recording medium traveling in the medium travel direction is regarded as a flow and is generally called a "trailing side". On the other hand, the side opposite to the side of the medium travel direction, that is, an inflow side is a "medium inflow side" and is generally called a "leading side".

In the thin film magnetic head or the magnetic recording apparatus according to the first aspect of the invention, a part of the sub-return magnetic pole layer is projected toward the uniform-width portion and is in contact with the gap layer, so that spread of the magnetic flux is suppressed due to the existence of the projected portion when the magnetic flux emitted from the uniform-width portion flows in the sub-return magnetic pole layer.

In the thin film magnetic head or the magnetic recording apparatus according to the second aspect of the invention, width of the first sub-return magnetic pole end surface is equal to or larger than width of the magnetic pole end surface and is less than width of the second sub-return magnetic pole end surface. Consequently, on the basis of the relation between the width of the magnetic pole end surface, the width of the first sub-return magnetic pole end surface, and the width of the second sub-return magnetic pole end surface, when the magnetic flux emitted from the uniform-width portion flows in the sub-return magnetic pole layer, spread of the magnetic flux is suppressed.

In the method of manufacturing the thin film magnetic head according to the first and second aspects of the invention, only the existing manufacturing processes are used to manufacture the thin film magnetic head having the sub-return magnetic pole layer disposed on the side of the medium travel direction of the magnetic pole layer, and a new manufacturing process is not used.

Other and further objects, features and advantages of the invention will appear more fully from the following description.

BRIEF DESCRIPTION OF THE DRAWINGS

FIGS. 7A and 7B are cross sections showing a process subsequent to FIGS. 6A and 6B.

DETAILED DESCRIPTION OF THE PRFERRED EMBODIMENTS

Embodiments of the invention will now be described in detail herein below with reference to the drawings.

Figure 1:
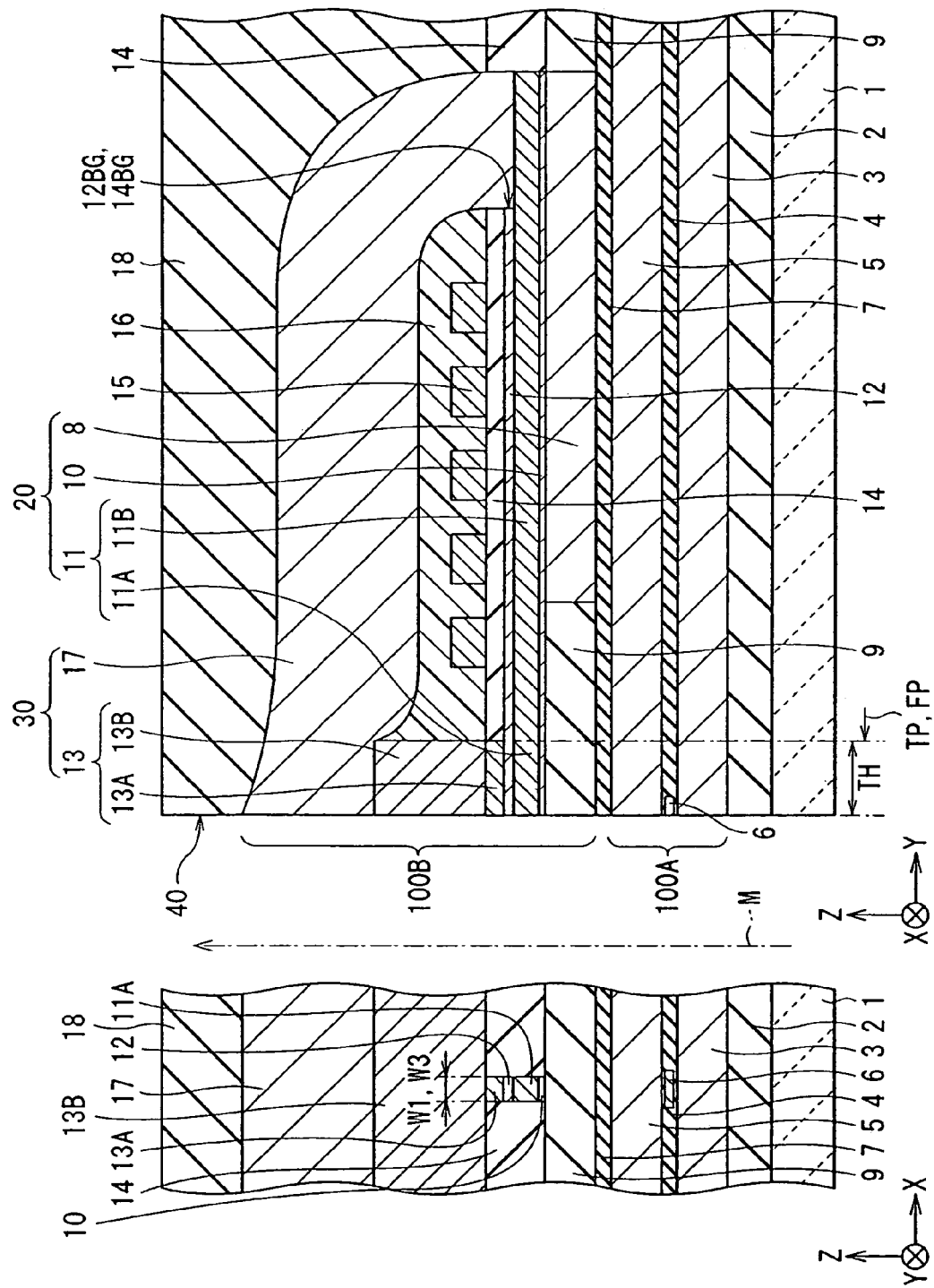
FIGS. 1A and 1B are cross sections showing a sectional configuration of a thin film magnetic head according to an embodiment of the invention.
Figure 2:
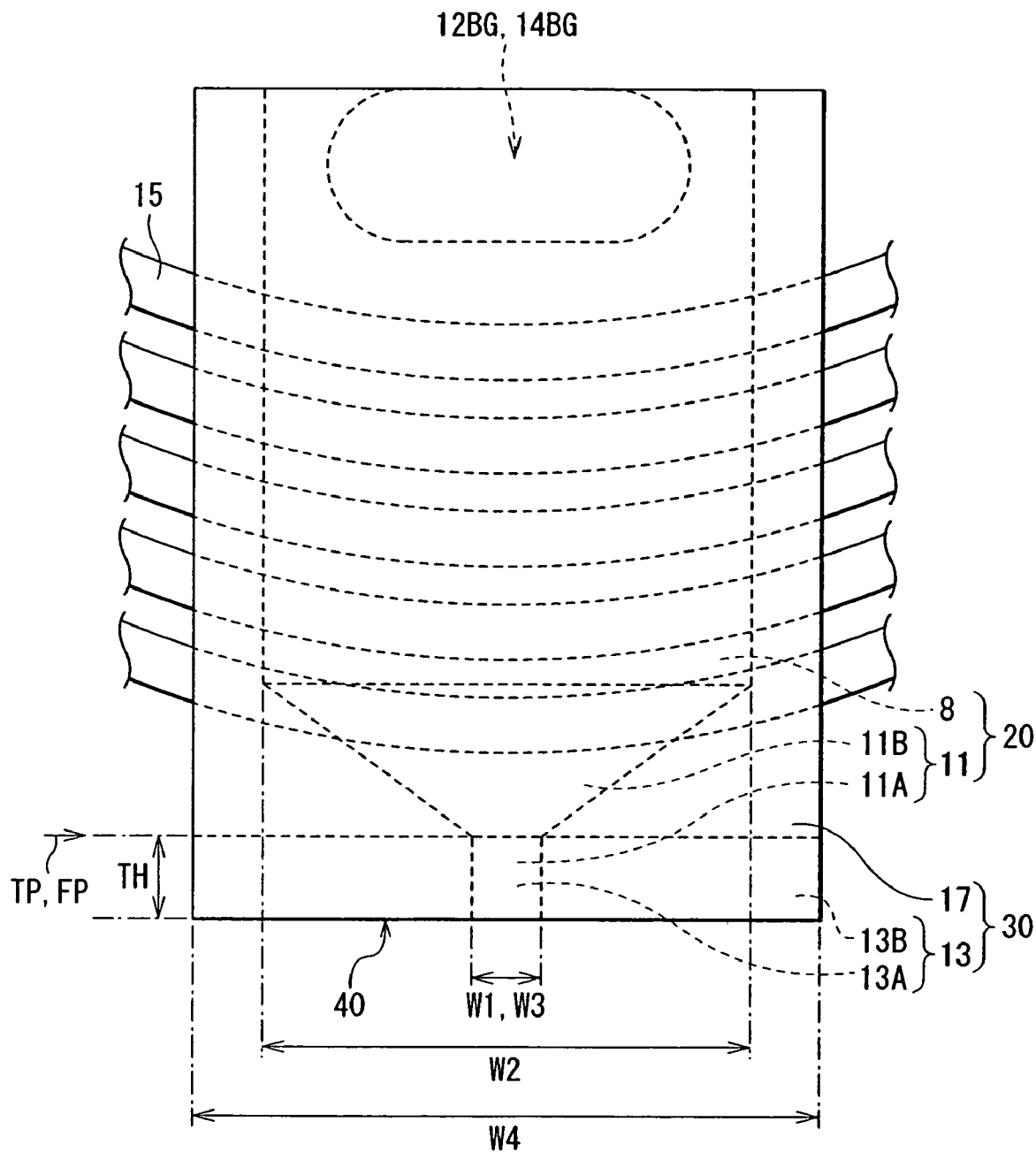
FIG. 2 is a plan view showing the configuration of main components of the thin film magnetic head illustrated in FIGS. 1A and 1B.
Figure 3:
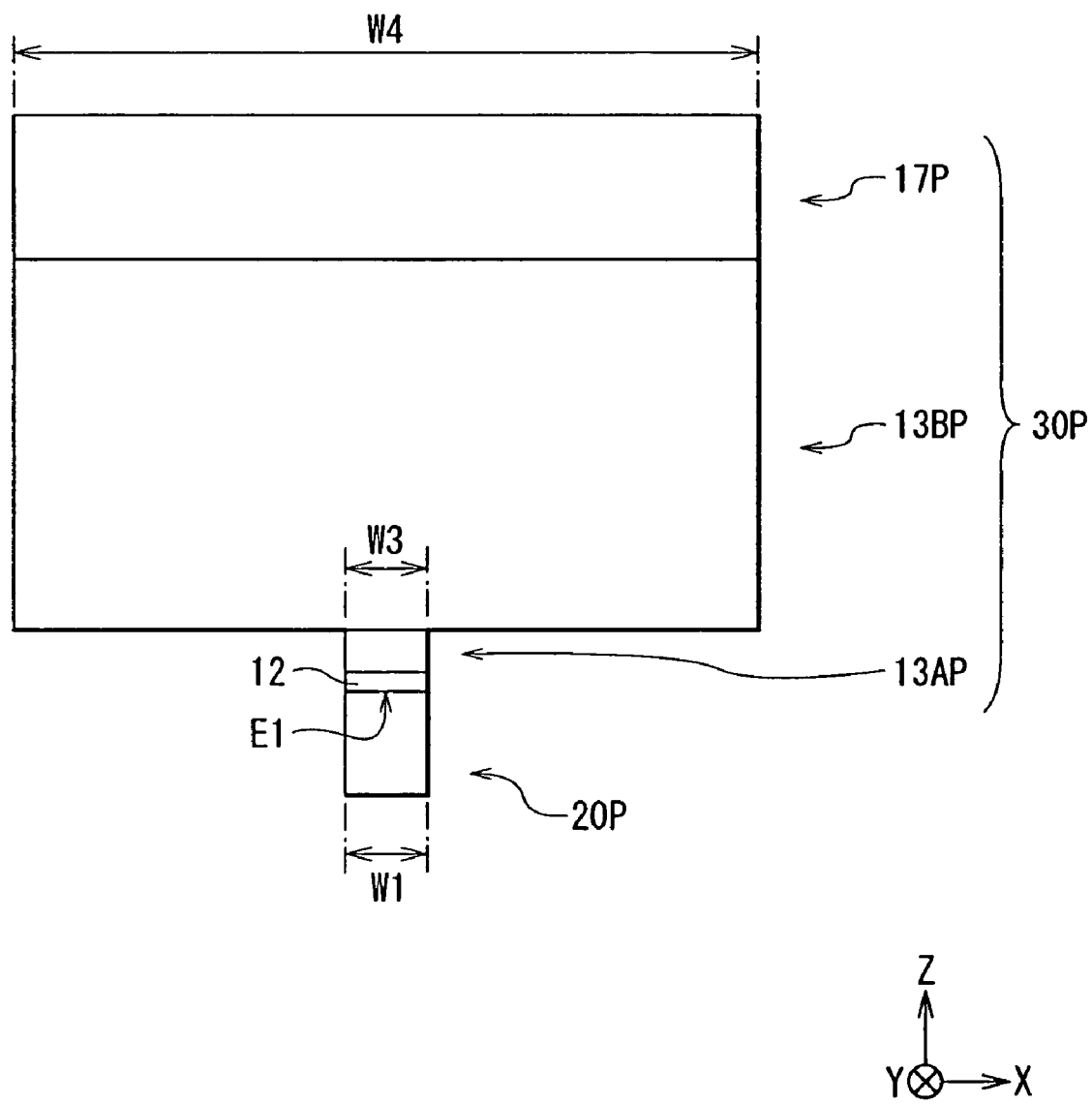
FIG. 3 is an enlarged plan view showing the configuration of exposed surfaces of main components of the thin film magnetic head illustrated in FIGS. 1A and 1B.

First, the configuration of a thin film magnetic head according to an embodiment of the invention will be described with reference to FIGS. 1A and 1B to FIG. 3. FIGS. 1A and 1B show sectional configurations of a thin film magnetic head. FIG. 1A shows a sectional configuration parallel to an air bearing surface 40 and FIG. 1B shows a section configuration perpendicular to the air bearing surface 40. FIG. 2 is a plan view showing the configuration of main components of the thin film magnetic head illustrated in FIGS. 1A and 1B. FIG. 3 shows an enlarged plan view of the configuration of an exposed surface of the main components. An upward arrow M shown in FIGS. 1A and 1B indicates the travel direction of a recording medium (not shown) relative to the thin film magnetic head, that is, the travel direction of a recording medium (medium travel direction).

In the following description, the distance in the X-axis direction shown in FIGS. 1A and 1B to FIG. 3 will be described as "width", the distance in the Y-axis direction will be described as "length", and the distance in the Z-axis direction will be described as "thickness". The side closer to the air bearing surface 40 in the Y-axis direction will be described as "front side or forward" and the side opposite to the front side will be described as "rear side or rearward". The description will be similarly used in FIGS. 4A and 4B and subsequent drawings.

The thin film magnetic head is, for example, a composite head capable of executing the functions of both recording and reproducing. As shown in FIGS. 1A and 1B, the thin film magnetic head has a configuration obtained by sequentially stacking, on a substrate 1 made of a ceramic material such as AlTiC ($Al_2O_3 \cdot TiC$), an insulating layer 2 made of a non-magnetic insulating material such as aluminum oxide ($Al_2O_3$, herein below, simply called "alumina"), a reproducing head portion 100A for executing a reproducing process by using a magneto-resistive (MR) effect, an isolation layer 7 made of a non-magnetic insulating material such as alumina, a recording head portion 100B of a single magnetic pole type for executing a recording process of a perpendicular recording method, and an overcoat layer 18 made of a non-magnetic insulating material such as alumina.

The reproducing head portion 100A has, for example, a configuration in which a lower shield layer 3, a shield gap film 4, and an upper shield layer 5 are stacked in this order. In the shield gap film 4, an MR device 6 as a reproducing device is buried so that one end face is exposed in the recording-medium-facing surface (air bearing surface) 40 which faces a recording medium.

The lower and upper shield layers 3 and 5 are made of, for example, a magnetic material such as a nickel iron alloy (NiFe (for example, Ni: 80% by weight and Fe: 20% by weight) which will be simply called "permalloy (trademark)" herein below). Each of the layers has a thickness of about 1.0 μm to 2.0 μm. The shield gap film 4 is used to electrically isolate the MR device 6 from the periphery and is made of, for example, a non-magnetic insulating material such as alumina. The MR device 6 is provided to execute a reproducing process by using GMR (Giant Magneto-Resistive) or TMR (Tunneling Magneto-Resistive) effect.

The recording head portion 100B has a configuration obtained by, for example, sequentially stacking a magnetic pole layer 20 and a gap layer 12 buried by insulating layers 9 and 14, a thin film coil 15 for generating magnetic flux buried by an insulating layer 16 together with the insulating layer 14, and a return yoke layer 30 (return magnetic pole layer). FIG. 2 shows only the magnetic pole layer 20, the thin film coil 15, and the return yoke layer 30 in the recording head portion 100B.

The magnetic pole layer 20 is provided to contain a magnetic flux generated by the thin film coil 15 and to emit the magnetic flux toward a recording medium. The magnetic pole layer 20 extends rearward from the air bearing surface 40. The magnetic pole layer 20 has a configuration that an auxiliary magnetic pole layer 8 functioning as a part for containing an auxiliary magnetic flux for assuring a magnetic flux containing amount (herein below, called "magnetic volume") and a main magnetic pole layer 11 functioning as a part for containing the main magnetic flux and for emitting the contained magnetic flux are stacked in this order while sandwiching a seed layer 10. The magnetic pole layer 20 has, for example, as shown in FIG. 3, a rectangular exposed surface 20P (width W1: magnetic pole end surface) exposed in the air bearing surface 40. Incidentally, the auxiliary magnetic pole layer 8 is not a so-called return pole.

The auxiliary magnetic pole layer 8 extends, for example, from a position receded from the air bearing surface 40 and is coupled to the main magnetic pole layer 11. The auxiliary magnetic pole layer 8 is made of, for example, a magnetic material similar to that of the main magnetic pole layer 11 and has a rectangular plane shape. "Coupling" in the invention denotes not simple contact but a state of contact and magnetic conduction.

The main magnetic pole layer 11 extends rearward from the air bearing surface 40 and includes, for example, a front end portion 11A (uniform width portion) extending rearward from the air bearing surface 40 while keeping the uniform width W1 and a rear end portion 11B coupled to the rear side of the front end portion 11A and having width W2 larger than the width WI of the front end portion 11A (W2>W1). The width W1 of the front end portion 11A specifies the recording track width of a recording medium and is about 0.3 μm or less. The width WI of the front end portion 11A specifying the recording track width of a recording medium is, strictly, the width of an edge E1 on the trailing side of the exposed surface 20P shown in FIG. 3. For example, the width of the rear end portion 11B gradually increases to the rear side in the front portion and is uniform (width W2) in the rear portion. The position where the front end portion 11A and the rear end portion 11B are coupled to each other is the position from which the width of the main magnetic pole layer 11 increases from the front end portion 11A to the rear end portion 11B, that is, a flare point FP as one of important factors for determining the recording performance of the thin film magnetic head. The main magnetic pole layer 11 is made of a magnetic material such as an iron cobalt alloy (FeCo) based magnetic material or an iron cobalt nickel alloy (FeCoNi) based magnetic material. The thickness of the main magnetic pole layer 11 is about 0.2 μm to 0.3 μm. The insulating film 9 is made of, for example, a non-magnetic insulating material such as alumina.

The seed layer 10 is used for performing a plating process in the process for manufacturing the thin film magnetic head. Concretely, the seed layer 10 is used to form, for example, the main magnetic pole layer 11, the gap layer 12, and a part of the return yoke layer 30 (a lower TH specifying part 13A), and is made of a magnetic material similar to that of the main magnetic pole layer 11. The seed layer 10 has, for example, a shape in plan view corresponding to the shape in plan view of the main magnetic pole layer 11.

The gap layer 12 is to provide a magnetic gap between the magnetic pole layer 20 and the return yoke layer 30 near the air bearing surface 40. The gap layer 12 is made of a non-magnetic material such as nickel phosphorus (NiP) and has a thickness of about 0.2 μm or less. The gap layer 12 has a back gap 12BG for coupling.

The thin film coil 15 has, for example, a winding structure that a wire is spirally wound around the back gap 12BG as a center and is made of a high-conductive material such as copper (Cu). In FIGS. 1A and 1B and FIG. 2, only a part of a plurality of turns constructing the thin film coil 15 is shown.

The insulating layers 14 and 16 are provided to electrically isolate the thin film coil 15 from the periphery. The insulating layer 14 is made of, for example, a nonmagnetic insulating material such as alumina, is adjacent to the gap layer 12, and has a back gap 14BG for coupling. The front end position of the insulating layer 14 is a throat height zero position TP as one of important factors determining the recording performance of the thin film magnetic head. A distance between the throat height zero position TP and the air bearing surface 40 is a throat height TH. On the other hand, the insulting layer 16 is made of a photoresist (photosensitive resin), spin on glass (SOG), or the like which displays fluidity when heated, and has a rounded and inclined surface.

The return yoke layer 30 is to, mainly, return a magnetic flux (return magnetic flux) emitted from the magnetic pole layer 20 and magnetized a recording medium. The return yoke layer 30 extends rearward from the air bearing surface 40 on the trailing side of the magnetic pole layer 20. The return yoke layer 30 is apart from the magnetic pole layer 20

(front end portion 11A) by the gap layer 12 on the side close to the air bearing surface 40 and is coupled to the magnetic pole layer 20 (rear end portion 11B) via the back gaps 12BG and 14BG on the side far from the air bearing surface 40. Specifically, the return yoke layer 30 includes two elements apart from each other; a yoke portion 17 (main return magnetic pole layer) extending rearward from the air bearing surface 40 and coupled to the magnetic pole layer 20 in its rear end region; and a TH specifying portion 13 (sub-return magnetic pole layer) which is isolated from the magnetic pole layer 20 by the gap layer 12, is coupled to the yoke portion 17, and extends from the air bearing surface 40 to a predetermined rearward position (the front end position of the insulating layer 14) in a region between the gap layer 12 and the yoke portion 17. The insulating layer 14 in which the thin film coil 15 is buried is adjacent to the TH specifying portion 13. That is, the TH specifying portion 13 plays the role of specifying the front end position (throat height zero position TP) of the insulating layer 14.

The TH specifying portion 13 functions as a main inflow port of the return magnetic flux and has a configuration that a portion corresponding to the front end portion 11A is projected toward the front end portion 11A and is in contact with the gap layer 12. Concretely, the TH specifying portion 13 is obtained by stacking, in order from the side close to the front end portion 11A, two components isolated from each other; a lower TH specifying part 13A (first sub-return magnetic pole layer portion) isolated from the magnetic pole layer 20 by the gap layer 12 and having width W3 equal to or larger than the width W1 of the front end portion 11A (W3□W1); and an upper TH specifying part 13B (second sub-return magnetic pole layer portion) having width W4 larger than the width W3 of the lower TH specifying part 13A (W4>W3). For example, the width W3 of the lower TH specifying part 13A is equal to the width W1 of the front end part 11A (W3=W1), and the width W4 of the upper TH specifying part 13B is larger than the width W2 of the rear end part 11B (W4>W2). The lower TH specifying part 13A and the upper TH specifying part 13B are made of, for example, a magnetic material similar to that of the main magnetic pole layer 11. In particular, saturated magnetic flux density D1 of the lower TH specifying part 13A is equal to or lower than saturated magnetic flux density D2 of the front end portion 11A (D1□D2), and saturated magnetic flux density D3 of the upper TH specifying part 13B is equal to or lower than the saturated magnetic flux density D1 of the lower TH specifying part 13A (D3□D1). Each of the lower TH specifying part 13A and the upper TH specifying part 13B has, for example, a rectangular plane shape.

The yoke portion 17 functions as a main passage of the return magnetic flux. The yoke portion 17 is made of, for example, a magnetic material similar to that of the TH specifying part 13 and has the same width W3 as that of the upper TH specifying part 13B.

The return yoke layer 30 has, for example, as shown in FIG. 3, an almost T-shaped exposed surface 30P exposed in the air bearing surface 40. The exposed surface 30P is a combination of an exposed surface 13AP (first sub-return magnetic pole end face) of the lower TH specifying part 13A having the width W3 equal to the width W1 of the exposed surface 20P, an exposed surface 13BP (second sub-return magnetic pole end surface) of the upper TH specifying part 13B having the width W4 larger than the width W3 of the exposed surface 13AP, and an exposed surface 17P of the yoke portion 17 having the width W3. For example, both of the width W1 of the exposed surface 20P and the width W3 of the exposed surface 13AP are uniform without varying according to a position. The width W4 of the exposed surfaces 13BP and 17P is, for example, ten times as wide as the width W3 of the exposed surface 13AP (W4□10×W3).

The "trailing side" is a side of outflow of a recording medium (medium outflow side) when a traveling state of the recording medium traveling in the medium travel direction M (refer to FIGS. 1A and 1B) is regarded as a flow. In this case, the trailing side is an upper side in the thickness direction (Z-axis direction). On the other side, the "leading side" is an inflow side (medium inflow side) and is a downward side in the thickness direction.

The operation of the thin film magnetic head will now be described with reference to FIGS. 1A and 1B and FIG. 2.

In the thin film magnetic head, at the time of recording information, when a current flows into the thin film coil 15 of the recording head portion 100B via a not-shown external circuit, a magnetic flux is generated by the thin film coil 15. The magnetic flux generated at this time is contained by the auxiliary magnetic pole layer 8 and the main magnetic pole layer 11 constructing the magnetic pole layer 20 and, after that, flows from the rear end portion 11B to the front end portion 11A in the main magnetic pole layer 11. Since the magnetic flux flowing in the main magnetic pole layer 11 is converged at the flare point FP, the magnetic flux is concentrated in the trailing side portion of the front end portion 11A. When the magnetic flux is emitted from the front end portion 11A to the outside, a recording magnetic field is generated in the direction orthogonal to the surface of a recording medium and the recording medium is magnetized in the perpendicular direction by the recording magnetic field, thereby magnetically recording information onto the recording medium. When the magnetic flux is emitted from the front end portion 11A to the outside, a spread component of the magnetic flux to the periphery flows into the return yoke layer 30 (TH specifying portion 13). The magnetic flux which has magnetized a recording medium (return magnetic flux) is returned to the return yoke layer 30.

At the time of reproducing, when a sense current flows into the MR device 6 in the reproducing head portion 100A, the resistance value of the MR device 6 changes according to a signal magnetic field for reproducing from the recording medium. Since the resistance change is detected as a change in the sense current, the information recorded on the recording medium is magnetically read.

A method of manufacturing the thin film magnetic head will now be described with reference to FIGS. 1A and 1B to FIGS. 12A and 12B. FIGS. 4A and 4B to FIGS. 12A and 12B are diagrams for explaining processes of manufacturing the thin film magnetic head and show sectional configurations corresponding to FIGS. 1A and 1B.

In the following, first, an outline of processes of manufacturing a whole thin film magnetic head will be described with reference to FIGS. 1A and 1B. After that, processes of forming a main portion (the recording head portion 100B) of the thin film magnetic head will be described in detail with reference to FIGS. 1A and 1B to FIGS. 12A and 12B. Since the materials, dimensions, structural features, and the like of the series of the components of the thin film magnetic head have been already described in detail, the description will not be repeated.

The thin film magnetic head is manufactured by sequentially forming and stacking the components by mainly using an existing thin film process including a film forming technique such as plating and sputtering, a patterning technique such as photolithography technique, and an etching technique such as dry etching. Specifically, first, as shown in FIGS. 1A and 1B, the insulating layer 2 is formed on the substrate 1 and, after that, the lower shield layer 3, the shield gap film 4 in which the MR device 6 is buried, and the upper shield layer 5 are stacked on the insulating layer 2 in accordance with this order, thereby forming the reproducing head portion 100A. Subsequently, the isolation layer 7 is formed on the reproducing head portion 100A. On the isolation layer 7, by sequentially stacking the magnetic pole layer 20 (auxiliary magnetic pole layer 8, seed layer 10, and main magnetic pole layer 11) and the gap layer 12 buried by the insulating layers 9 and 14, the thin film coil 15 buried together with the insulating film 14 by the insulating layer 16, and the return yoke layer 30 (the TH specifying portion 13 and the yoke portion 17), the recording head portion 100B is formed. Finally, the overcoat layer 18 is formed on the recording head portion 100B and, after that, the air bearing surface 40 is formed by using mechanism processing and polishing process, thereby completing the thin film magnetic head.

Figures 4A, 4B:
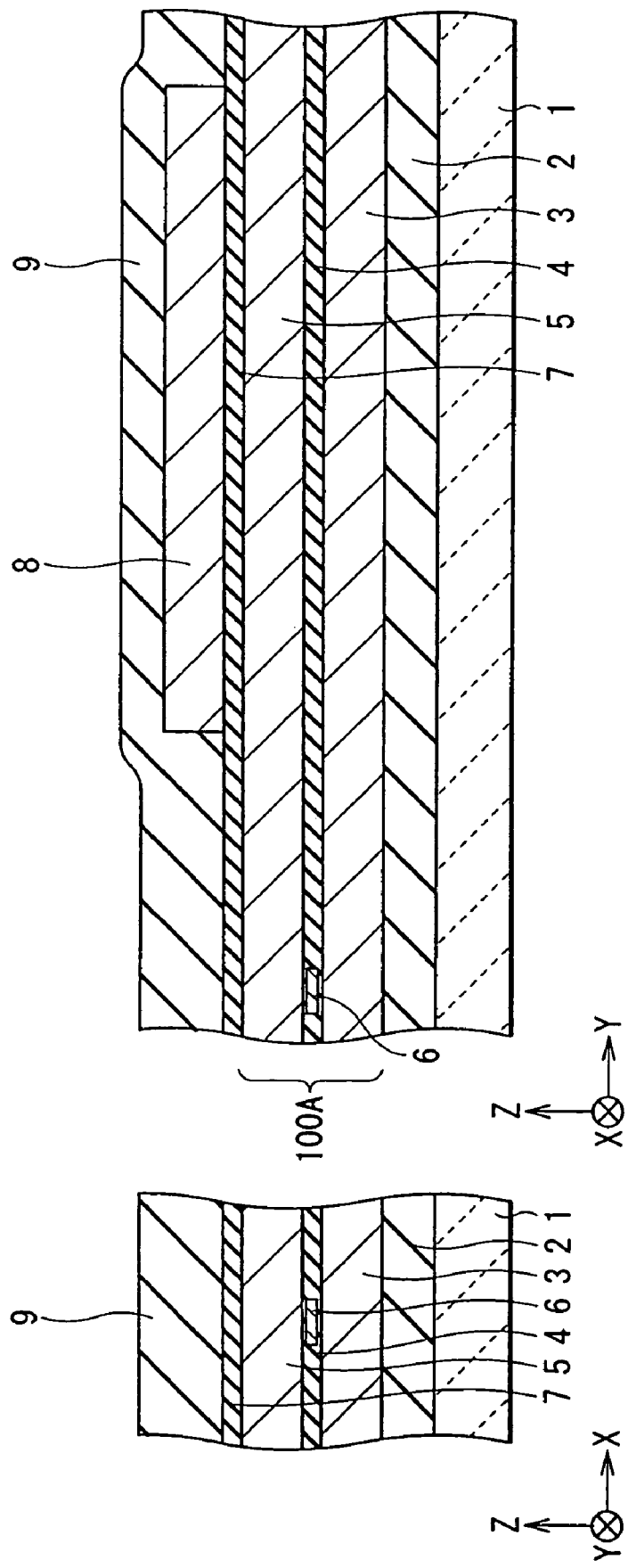
FIGS. 4A and 4B are cross sections for explaining one of processes of manufacturing the thin film magnetic head according to the embodiment of the invention.

At the time of forming the recording head portion 100B, after forming the isolation layer 7, first, as shown in FIGS. 4A and 4B, the auxiliary magnetic pole layer 8 is pattern formed on the isolation layer 7 so as to recede from the position (refer to FIGS. 1A and 1B) of the air bearing surface 40 formed in a post process by using, for example, plating process. Subsequently, for example, by using sputtering, the insulating layer 9 made of alumina is formed so as to cover the auxiliary magnetic pole layer 8 and the isolation layer 7 around the auxiliary magnetic pole layer 8.

Subsequently, by using, for example, CMP (Chemical Mechanical Polishing), the insulating layer 9 is polished until at least the auxiliary magnetic pole layer 8 is exposed, and is planarized, thereby burying the insulating layer 9 around the auxiliary magnetic pole layer 8.

Figures 5A, 5B:
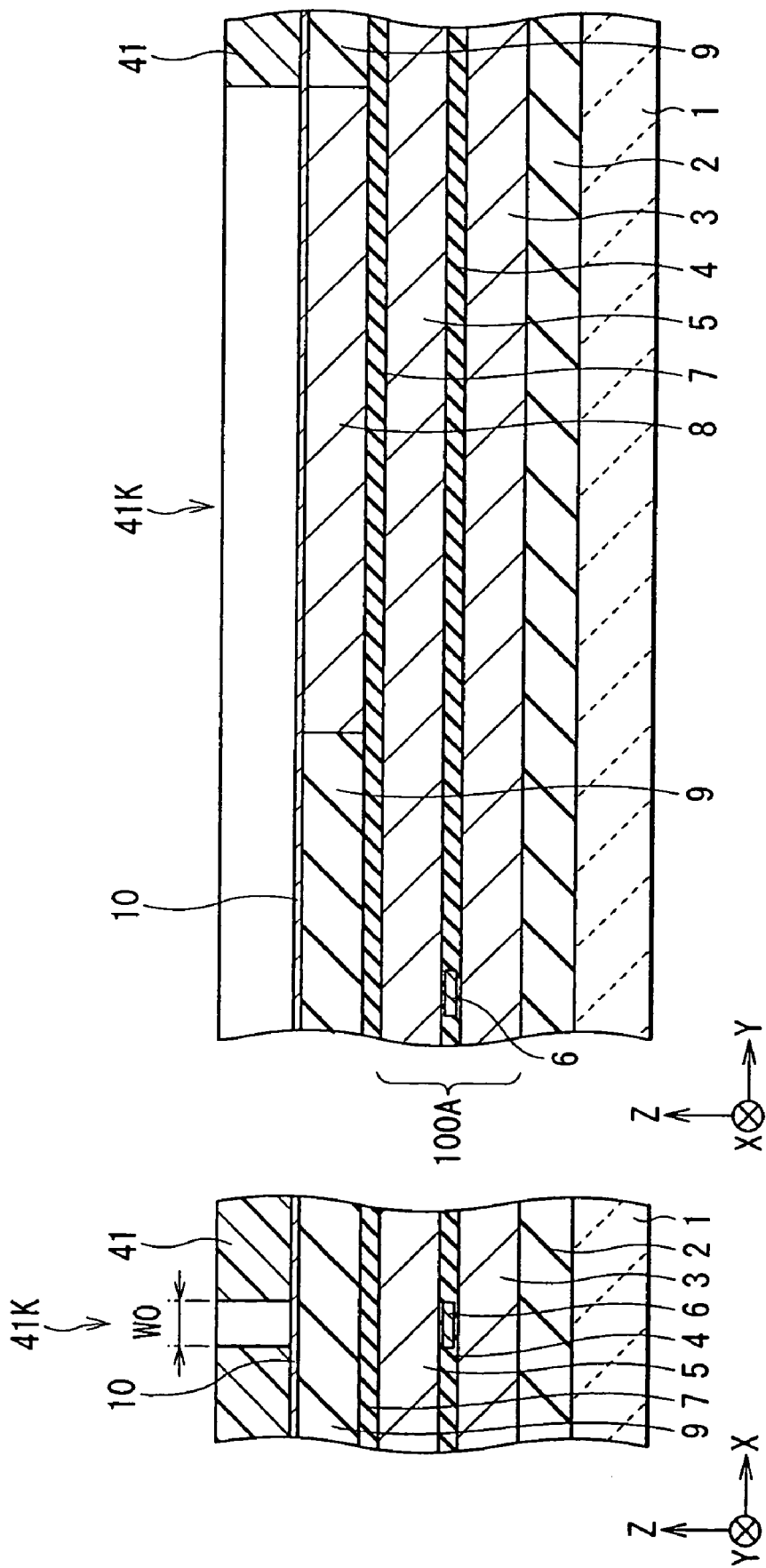
FIGS. 5A and 5B are cross sections showing a process subsequent to FIGS. 4A and 4B.

After that, on the planarized surface constructed by the auxiliary magnetic pole layer 8 and the insulating layer 9, as shown in FIGS. 5A and 5B, the seed layer 10 for performing plating process is formed.

After forming a photoresist film (not shown) so as to cover the seed layer 10, the photoresist film is patterned by using the photolithography process, thereby forming a photoresist pattern 41 (first photoresist pattern) having an opening region 41K as shown in FIGS. 5A and 5B. In the opening region 41K, the seed layer 10 is exposed. The photoresist pattern 41 is formed so that the opening region 41K corresponds to a plane shape of the main magnetic pole layer 11. Concretely, a front end portion (portion corresponding to the front end portion 11A) of the opening region 41K has width W0 larger than the width W1 (W0>W1), and a positive photoresist is used.

Figures 6A, 6B:
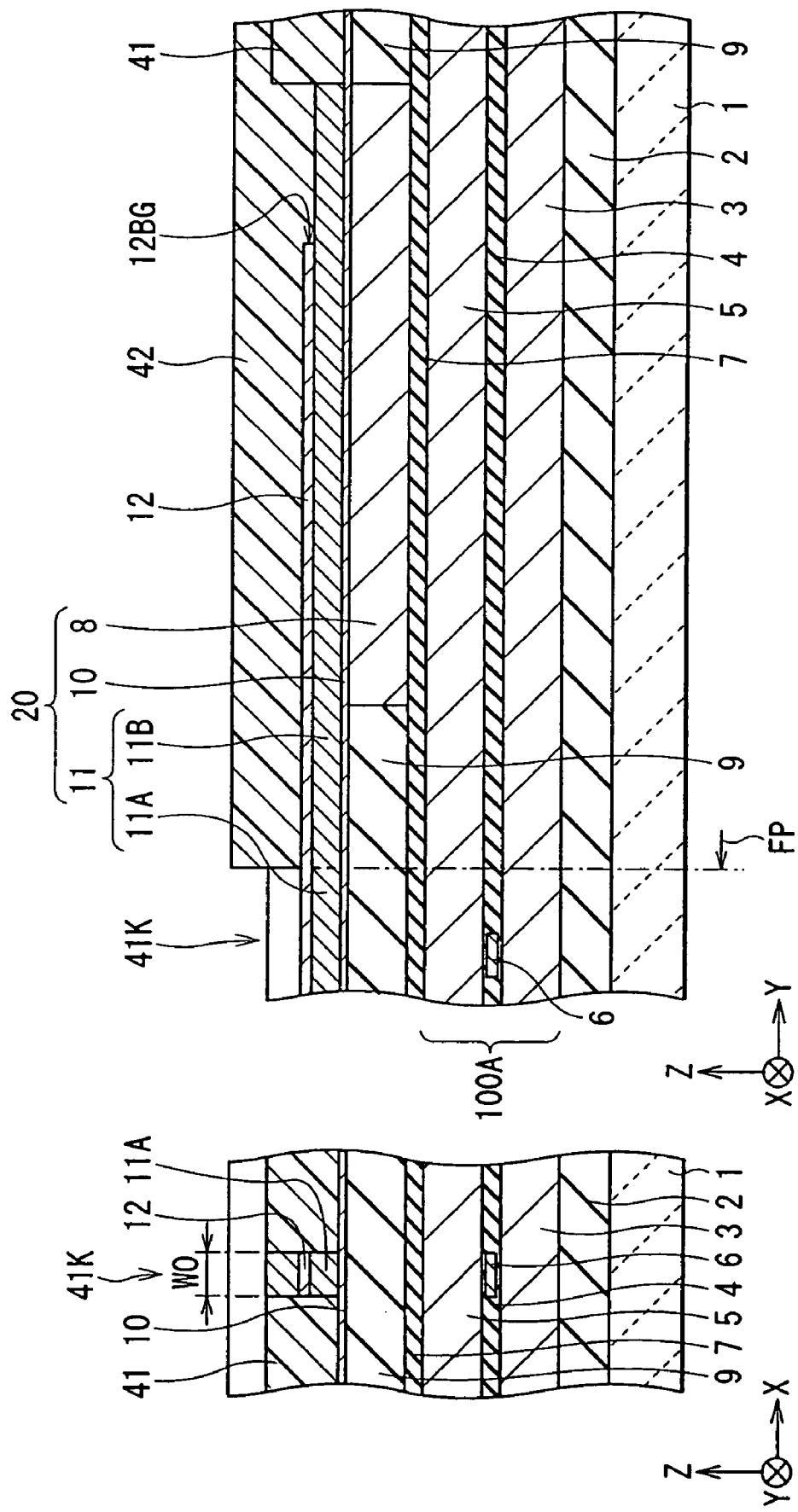
FIGS. 6A and 6B are cross sections showing a process subsequent to FIGS. 5A and 5B.

The seed layer 10 is used together with the photoresist pattern 41 and a plating film made of a magnetic material such as an iron cobalt alloy (FeCo) based magnetic material or iron cobalt nickel alloy (FeCoNi) based magnetic material is grown in the opening region 41K, thereby pattern forming the main magnetic pole layer 11 as shown in FIGS. 6A and 6B. The main magnetic pole layer 11 is formed so as to include, for example, as shown in FIG. 2, the front end portion 11A and the rear end portion 11B in order from the front side. As a result, the magnetic pole layer 20 in which the auxiliary magnetic pole layer 8 and the main magnetic pole layer 11 are stacked while sandwiching the seed layer 10 is formed.

Subsequently, the seed layer 10 is used together with the photoresist pattern 41 and a plating film made of a nonmagnetic material such as nickel phosphorus (NiP) is grown on the main magnetic pole layer 11 in the opening region 41K, thereby pattern forming the gap layer 12 as shown in FIGS. 6A and 6B. At the time of forming the gap layer 12, the back gap 12BG is not covered by using a not-shown mask or the like.

A photoresist (not shown) is formed so as to cover the photoresist pattern 41 and the opening region 41K and, after that, the photoresist film is patterned by using the photolithography process, thereby forming a photoresist pattern 42 (second photoresist pattern) in a region rearward of the region in which the TH specifying portion 13 is formed in a post process. The photoresist pattern 42 is formed so that, for example, the front end of the photoresist pattern 42 is positioned at the flare point FP of the main magnetic pole layer 11, the opening region 41K remains in a region forward of the flare point FP, and a negative photoresist is used.

By continuously using the seed layer 10, a plating film made of a magnetic material such as an iron cobalt alloy (FeCo) based magnetic material or iron cobalt nickel alloy (FeCoNi) based magnetic material is grown on the gap layer 12 in a remaining portion of the opening region 41K, specifically, the region surrounded by the photoresist patterns 41 and 42 in the opening region 41K. As a result, as shown in FIGS. 7A and 7B, the lower TH specifying part 13A is pattern formed so as to have a thickness of about 0.2 μm or more. At the time of forming the lower TH specifying part 13A, considering that the front end position of the insulating layer 14 (that is, the throat height zero position TP) formed in a post process is specified on the basis of the rear end position of the lower TH specifying part 13A, the formation position is adjusted. Obviously, to adjust the formation position of the lower TH specifying part 13A, the formation position of the photoresist pattern 41 is adjusted in a preprocess.

Figures 8A, 8B:
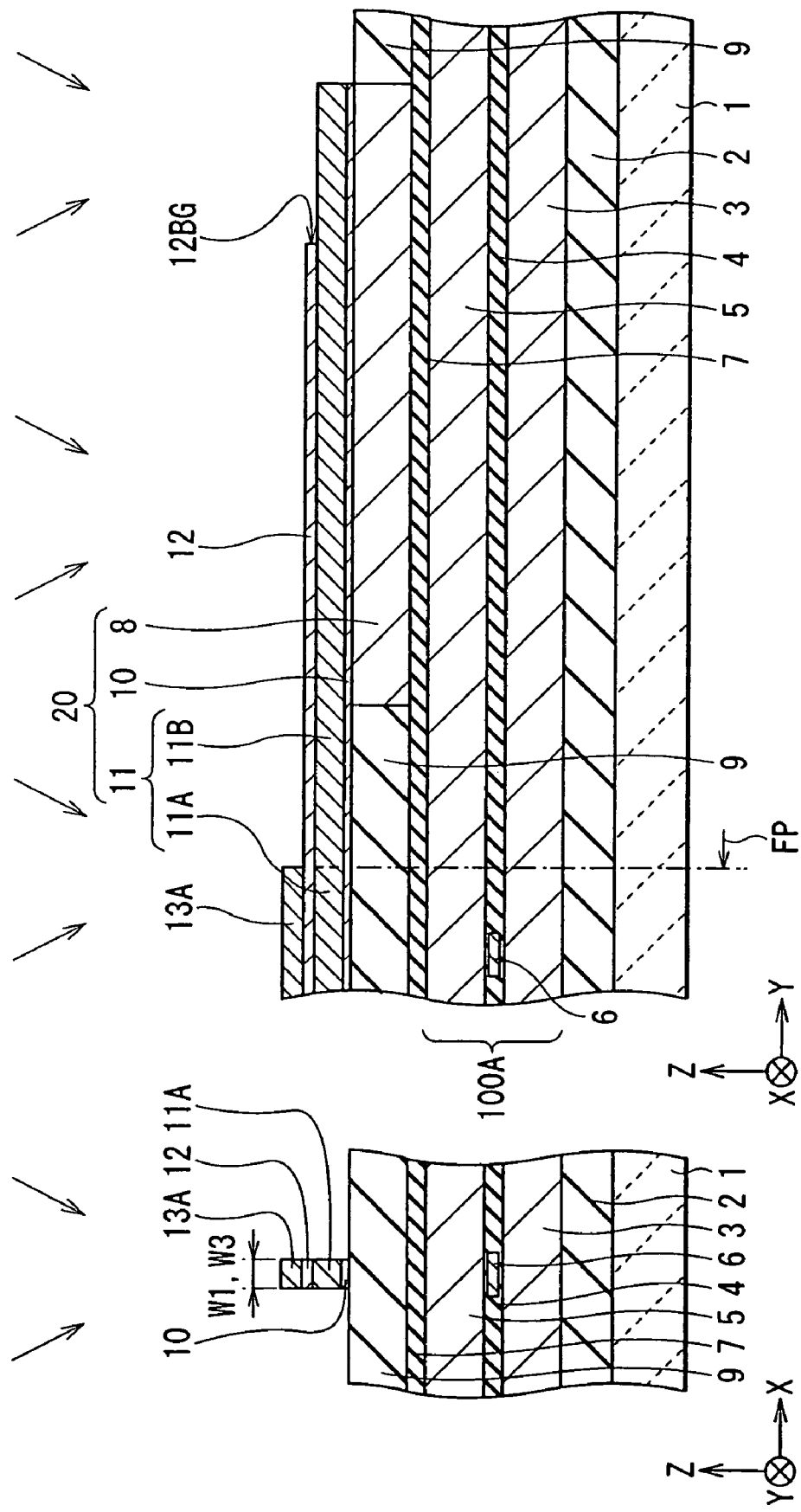
FIGS. 8A and 8B are cross sections showing a process subsequent to FIGS. 7A and 7B.

The photoresist patterns 41 and 42 are removed and, after that, for example, ion milling is performed on the whole main magnetic pole layer 11, gap layer 12, and lower TH specifying part 13A with a mask, as shown in FIGS. 8A and 8B to etch the seed layer 10, thereby selectively removing an unnecessary part (part except for the part corresponding to the main magnetic pole layer 11), and also to etch the front end portion 11A of the main magnetic pole layer 11 together with the gap layer 12 and the lower TH specifying part 13A from the width direction, thereby narrowing the width of the front end portion 11A. By the etching process, the width W0 of the front end portion 11A becomes the width W1 (W1<W0) and the width W0 of the lower TH specifying part 13A becomes the width W3 (W3=W1<W0).

Figures 9A, 9B:
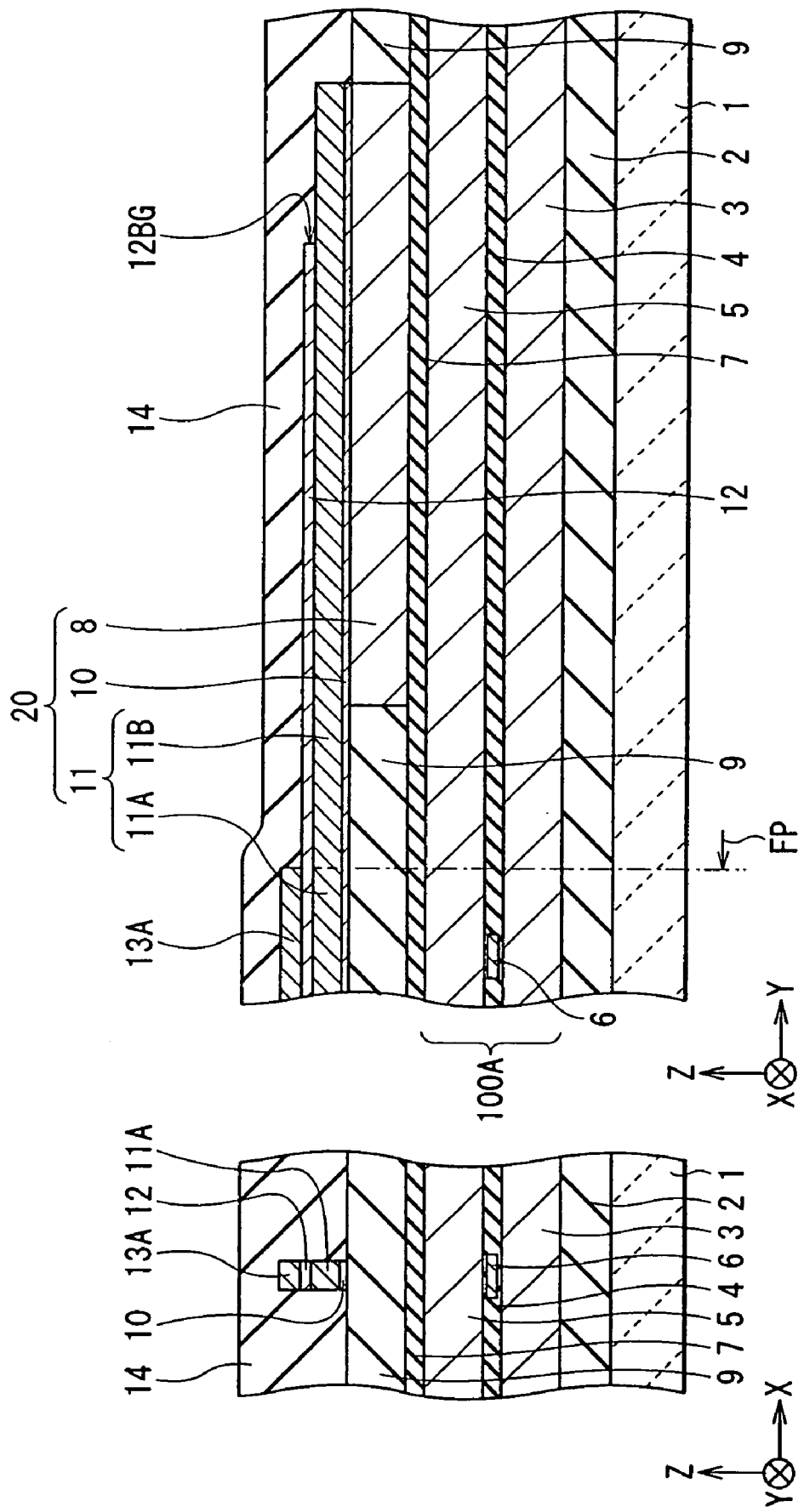
FIGS. 9A and 9B are cross sections showing a process subsequent to FIGS. 8A and 8B.

Subsequently, as shown in FIGS. 9A and 9B, by using, for example, sputtering, the insulating layer 14 is formed so as to cover the main magnetic pole layer 11, gap layer 12, lower TH specifying part 13A, and their peripheral regions.

Figures 10A, 10B:
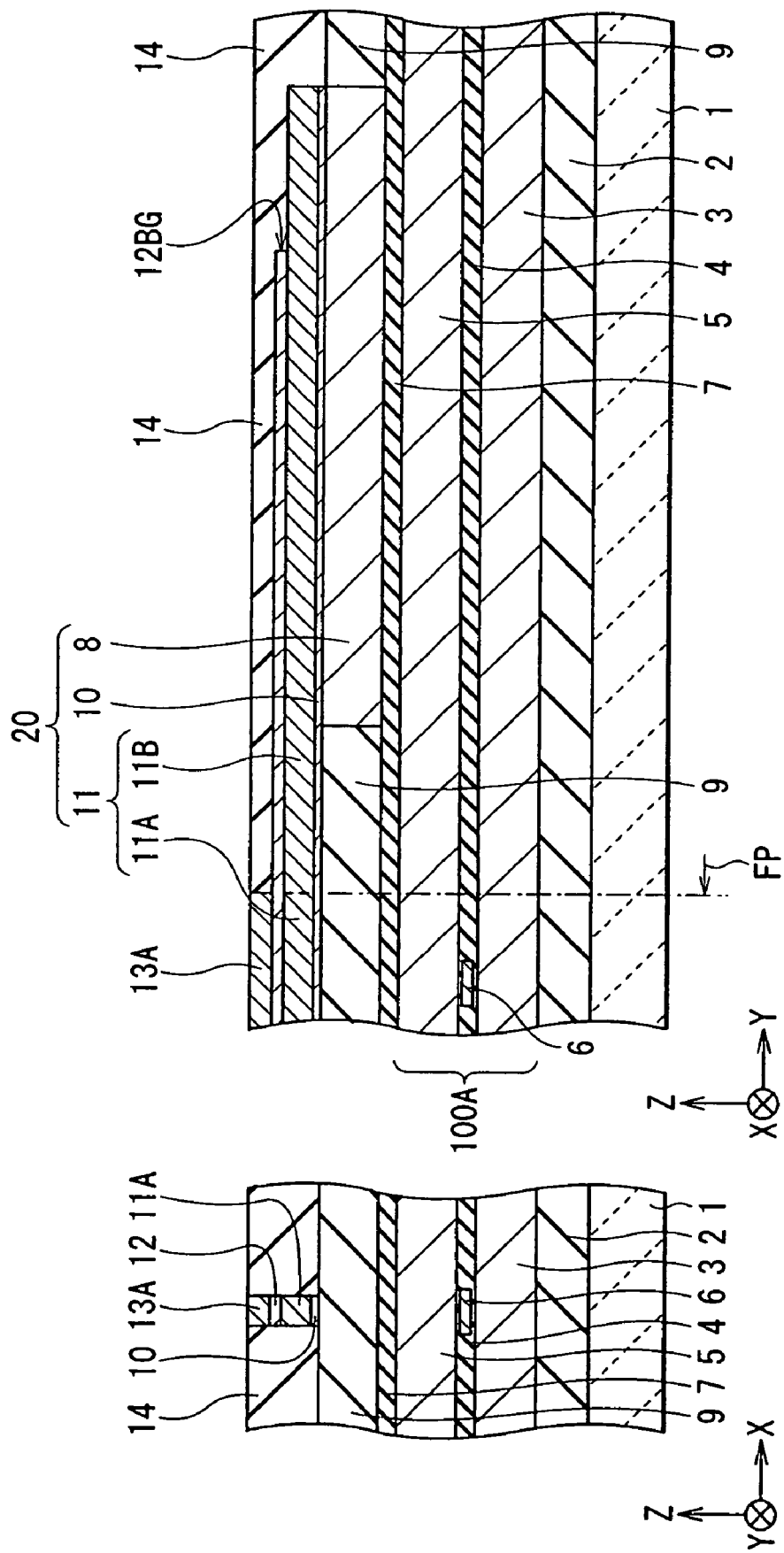
FIGS. 10A and 10B are cross sections showing a process subsequent to FIGS. 9A and 9B.

Subsequently, by using, for example, CMP, the insulating layer 14 is polished until at least the lower TH specifying part 13A is exposed, and is planarized, thereby burying the insulating layer 14 around the lower TH specifying part 13A as shown in FIGS. 10A and 10B. On the basis of the rear end position of the lower TH specifying part 13A, the front end position of the insulating layer 14 is specified. The front end position of the insulating layer 14 specified on the basis of the rear end position of the lower TH specifying portion 13A is the throat height zero position TP. At the time of polishing the insulating layer 14, for example, the lower TH specifying part 13A is polished together with the insulating layer 14. On the basis of the polishing amount, the final thickness of the lower TH specifying part 13A is determined. Concretely, for example, it is set so that the thickness of the lower TH specifying part 13A becomes about 0.1 μm after the polishing.

Figures 11A, 11B:
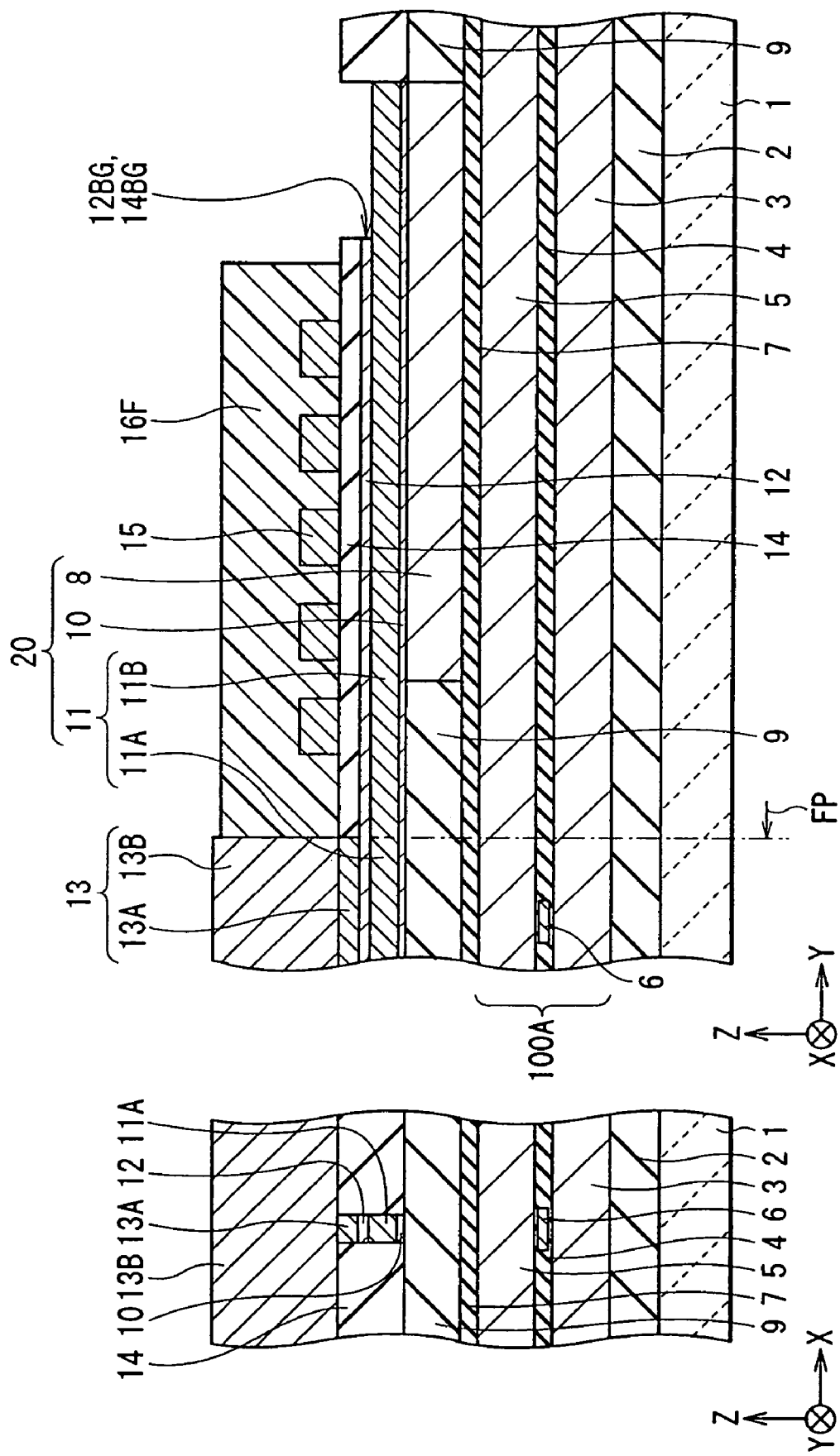
FIGS. 11A and 11B are cross sections showing a process subsequent to FIGS. 10A and 10B.

A portion corresponding to the back gap 12BG in the insulating layer 14 is selectively etched by using, for example, RIE (Reactive Ion Etching) and the back gap 14BG is formed in the insulating layer 14. After that, as shown in FIGS. 11A and 11B, for example, by using a plating process, the thin film coil 15 is pattern formed in the region between the lower TH specifying part 13A and the back gaps 12BG and 14BG on the planarized surface constructed by the lower TH specifying part 13A and the insulating layer 14. Subsequently, on the lower TH specifying part 13A, the upper TH specifying part 13B is pattern formed by using, for example, plating process or sputtering. The upper TH specifying part 13B is formed so as to have, for example, as shown in FIG. 2, the width W4 larger than the width W3 of the lower TH specifying part 13A and so that its rear end position coincides with the rear end position of the lower TH specifying part 13A. In such a manner, the TH specifying portion 13 in which the lower TH specifying part 13A and the upper TH specifying part 13B are stacked is formed. That is, the TH specifying portion 13 is formed so that the portion corresponding to the front end portion 11A is projected toward the front end portion 11A and is in contact with the gap layer 12. It is not always necessary to form the thin film coil 15 and, after that, to form the upper TH specifying part 13B. For example, after forming the upper TH specifying part 13B, the thin film coil 15 may be formed.

As shown in FIGS. 11A and 11B, by using the photolithography technique for example, the photoresist film 16F is pattern formed so as to cover the spaces between the turns of the thin film coil 15 and the periphery of the thin film coil 15. The photoresist film 16F is formed so that its front portion is adjacent to the TH specifying portion 13 (upper TH specifying part 13B).

Figures 12A, 12B:
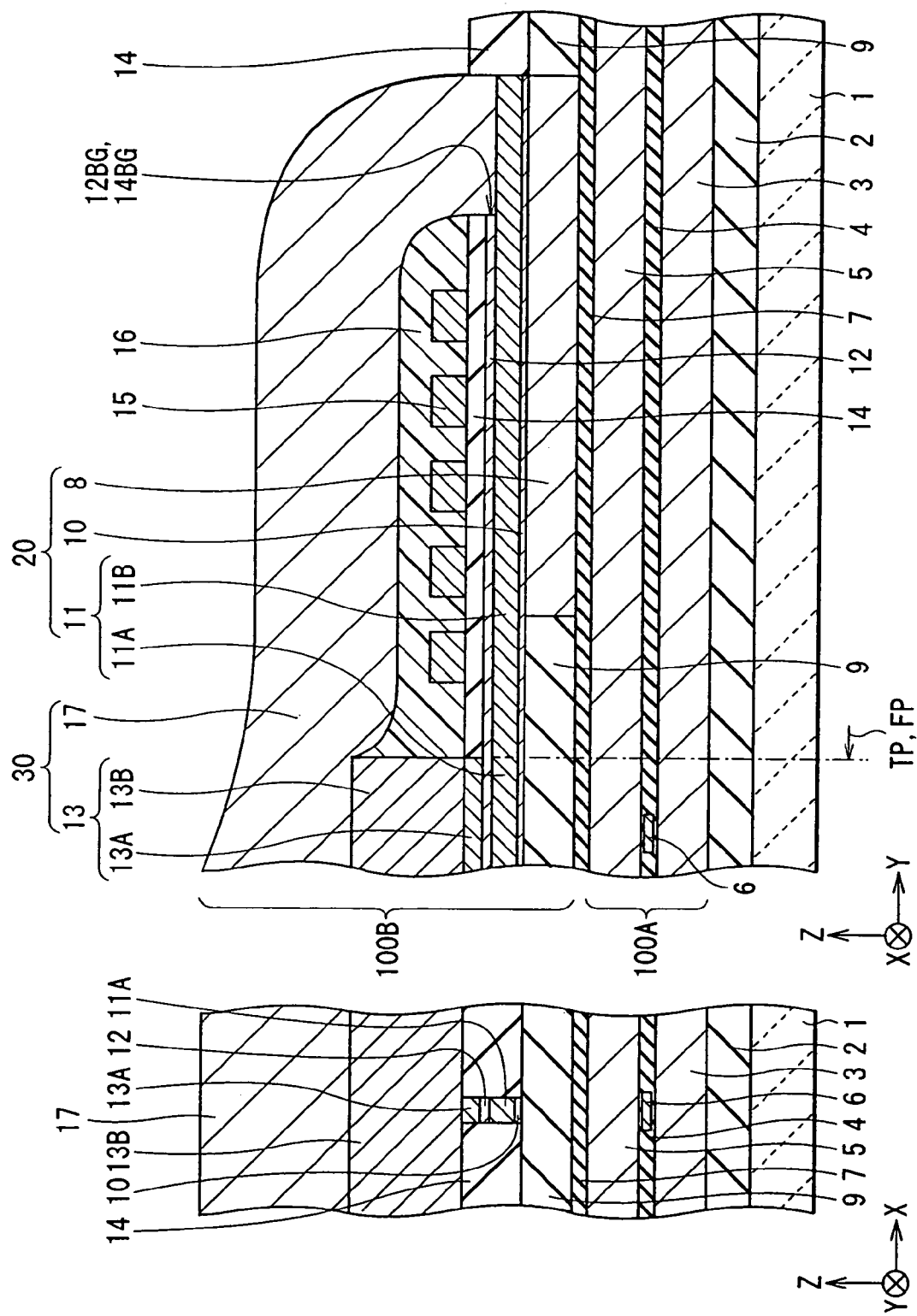
FIGS. 12A and 12B are cross sections showing a process subsequent to FIGS. 11A and 11B.

The photoresist film 16F is burned, thereby forming the insulating film 16 as shown in FIGS. 12A and 12B. Because of the burning, the photoresist film 16F fluidizes. Consequently, while the front portion of the insulating layer 16 remains adjacent to the TH specifying portion 13, the rear portion is rounded and inclined.

Subsequently, as shown in FIGS. 12A and 12B, for example, by using the plating process or sputtering, the yoke portion 17 made of Permalloy or iron cobalt nickel alloy (FeCoNi) is pattern formed so as to cover the insulating layer 14 and the periphery of the insulating layer 14. The yoke portion 17 is formed so as to be coupled to the TH specifying portion 13 in a front portion and is coupled to the magnetic pole layer 20 via the back gaps 12BG and 14BG in a rear portion. As a result, the return yoke layer 30 in which the TH specifying portion 13 and the yoke portion 17 are stacked is formed, and the recording head portion 100B is completed.

Finally, one end of the recording head portion 100B is polished by using mechanical processing and polishing processing, thereby forming the air bearing surface 40 as shown in FIGS. 1A and 1B. In such a manner, as shown in FIG. 3, the exposed surface 20P of the magnetic pole layer 20 and the exposed surface 30P (exposed surfaces 13AP, 13BP, and 17P) of the return yoke layer 30 are formed. The width W3 of the exposed surface 13AP is equal to or larger than the width W1 of the exposed surface 20P, concretely, equal to the width WI, and is less than the width W4 of the exposed surface 13BP.

The thin film magnetic head according to the embodiment has the return yoke layer 30 provided on the trailing side of the magnetic pole layer 20, and the TH specifying portion 13 in the return yoke layer 30 has the configuration that the portion corresponding to the front end portion 11A is projected toward the front end portion 11A and is in contact with the gap layer 12. More concretely, the width W3 of the exposed surface 13AP of the lower TH specifying part 13A is equal to the width W1 of the exposed surface 20P of the magnetic pole layer 20 and is less than the width W4 of the exposed surface 13BP of the upper TH specifying part 13B. In this case, the recording magnetic field gradient can be sharpened as much as possible and the recording performance can be improved for the following reasons.

Figure 13:
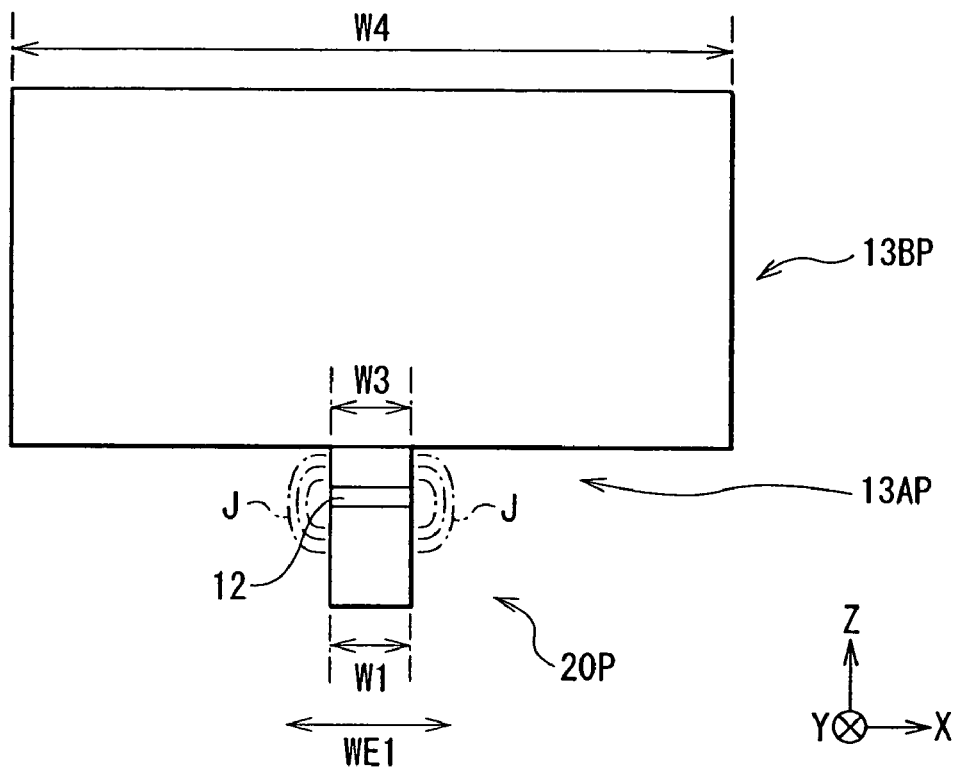
FIG. 13 is a plan view for explaining advantages of the thin film magnetic head according to the embodiment of the invention.
Figure 14:
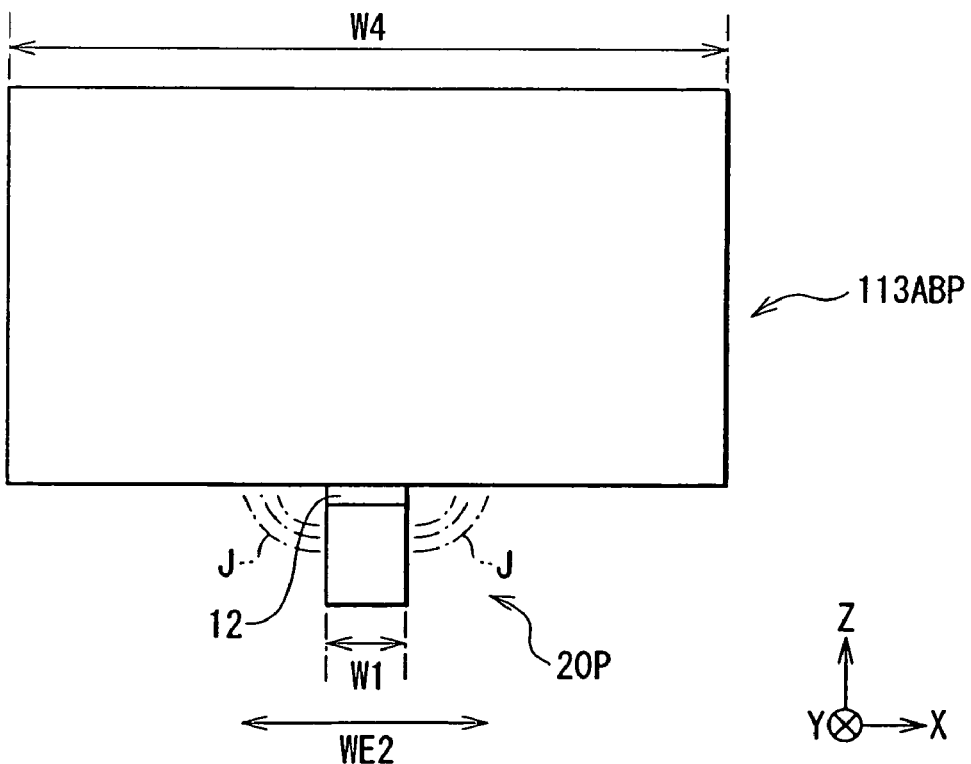
FIG. 14 is a plan view for explaining problems of a thin film magnetic head as a comparative example of the thin film magnetic head according to the embodiment of the invention.

FIG. 13 is a diagram for explaining advantages of the thin film magnetic head according to the embodiment and shows only the main components (the exposed surfaces 20P, 13AP, and 13BP) of the exposed surface of the thin film magnetic head shown in FIG. 3. FIG. 14 is a diagram for explaining problems regarding the thin film magnetic head as a comparative example of the thin film magnetic head according to the embodiment and shows the exposed surfaces (exposed surfaces 20P and 113ABP) corresponding to FIG. 13. The thin film magnetic head as a comparative example shown in FIG. 14 has a configuration similar to that of the thin film magnetic head according to the second embodiment except that it has an exposed surface 113ABP (width W4) corresponding to a body obtained by combining the exposed surfaces 13AP (width W3) and 13BP (width W4).

In the thin film magnetic head as the comparative example, as shown in FIG. 14, the wide exposed surface 113ABP (width W4) is disposed close to the narrow exposed surface 20P (width W1) with the gap layer 12 in between, so that a part (magnetic flux J) of a magnetic flux emitted from the exposed surface 20P to the outside at the time of recording flows into the exposed surface 113ABP while being largely spread in the width direction. In this case, due to spread of the magnetic flux J, the width of writing to the recording medium is conspicuously increased. That is, there is the possibility that actual recording track width (magnetic track width) WE2 is much larger than the recording track width (optical track width) W1 in designing.

In contrast, in the thin film magnetic head of the embodiment, as shown in FIG. 13, the narrow exposed surface 13AP (width W3=W1) is disposed near the narrow exposed surface 20P (width W1) with the gap layer 12 in between. Consequently, different from the case of the comparative example in which the wide exposed surface 113ABP is disposed close to the narrow exposed surface 20P, the magnetic flux J emitted from the exposed surface 20P to the outside flows into the exposed surface 13AP while being spread a little in the width direction. In this case, although the magnetic track width WE1 is wider than the optical track width W1 due to the spread of the magnetic flux J, the magnetic track width WE1 is smaller than the magnetic track width WE2 of the comparative example (WE1<WE2). Therefore, in the embodiment, spread of the magnetic flux J at the time of recording is suppressed, so that the recording magnetic field gradient can be sharpened as much as possible and the recording performance can be improved. In particular, by using the thin film magnetic head, further improvement in the recording performance expected in future can be addressed.

In the embodiment, the saturated magnetic flux density D1 of the lower TH specifying part 13A is set to be equal to or lower than the saturated magnetic flux density D2 of the front end portion 11A (D1☐D2). In particular, by setting the saturated magnetic flux density D1 of the lower TH specifying part 13A to be equal to the saturated magnetic flux density D2 of the front end portion 11A, the saturated magnetic flux density which is almost the same as that of the front end portion 11A functioning as a main magnetic flux discharge passage is assured in the lower TH specifying part 13A, and the flow of the magnetic flux from the front end portion 11A to the TH specifying portion 13 is made smooth. Therefore, the magnetic flux flowed in the TH specifying portion 13 is prevented from being saturated, so that the invention can contribute to improvement in recording performance from this viewpoint.

In the embodiment, the exposed surface 13BP of the upper TH specifying part 13B has the width W4 larger than the width W3 of the exposed surface 13AP of the lower TH specifying part 13A. In particular, the width W4 is set to be ten times as large as the width W3. Consequently, as shown in FIG. 3, as compared with the area of the exposed surface 13AP, the area of the exposed surface 13BP is sufficient larger. In this case, as described with reference to FIG. 13, while effectively preventing spread of the magnetic flux J by using the exposed surface 13AP of a small area, by using the exposed surface 13BP of a large area, the return magnetic flux can be sufficiently flowed into the return yoke layer 30. Therefore, the embodiment can contribute to improvement in recording performance also from this viewpoint.

In particular, in a method of manufacturing the thin film magnetic head according to the embodiment, to manufacture a thin film magnetic head having a characteristic configuration that the return yoke layer 30 (TH specifying portion 13 and yoke portion 17) disposed on the trailing side of the magnetic pole layer 20 is provided, only the existing manufacturing processes including the film forming process and the patterning process are used but a new manufacturing process is not used. In the embodiment, therefore, the thin film magnetic head of the invention having improved recording performance by sharpening the recording magnetic field gradient as much as possible can be manufactured stably and easily.

In the embodiment, one seed layer 10 is used to form the main magnetic pole layer 11, gap layer 12, and lower TH specifying part 13A by using the plating process, so that it is unnecessary to form a seed layer for each of the main magnetic pole layer 11, gap layer 12, and lower TH specifying part 13A. Therefore, also from the viewpoint, the invention can contribute to facilitate manufacturing of the thin film magnetic head.

In the embodiment, the insulating film 14 burying the thin film coil 15 is arranged adjacent to the lower TH specifying part 13A, so that, on the basis of the rear end position of the lower TH specifying part 13A, the front end position of the insulating layer 14, that is, the throat height zero position TP is specified. Therefore, the throat height zero position TP can be stably determined by using the lower TH specifying part 13A.

In the embodiment, at the time of burying the insulating layer 14 around the lower TH specifying part 13A, the lower TH specifying part 13A is polished together with the insulating layer 14. On the basis of the polishing amount, the final thickness of the lower TH specifying part 13A is determined. Thus, on the basis of the polishing amount of the insulating layer 14, the final thickness of the lower TH specifying part 13A can be controlled. In this case, in particular, if initial thickness of the lower TH specifying part 13A is about 0.2 μm or larger, the final thickness of the lower TH specifying part 13A can be freely set by using the polishing process.

In the embodiment, to form the photoresist patterns 41 and 42, photoresists of different types are used. Concretely, to form the photoresist pattern 41, a positive photoresist is used. To form the photoresist pattern 42, a negative photoresist is used. Consequently, the photoresist pattern 41 is formed in a predetermined pattern shape and, after that, the photoresist pattern 42 can be formed in a predetermined pattern shape on the photoresist pattern 41. Therefore, by using the photoresist pattern 41 and/or the photoresist pattern 42, the main magnetic pole layer 11, gap layer 12, and lower TH specifying part 13A can be formed stably and easily.

In the embodiment, the main pole layer 11 is formed by using the photoresist pattern 41 and, after that, the front end portion 11A is narrowed by using ion milling. Thus, as compared with the case of forming the main magnetic pole layer 11 by using only the photoresist pattern 41, the front end portion 11A can be narrowed extremely with high precision. Since there is limitation in pattern precision of the photolithography process used to form the photoresist pattern 41, in the case of forming the main magnetic pole layer 11 by using only the photoresist pattern 41, the main magnetic pole layer 11 cannot be formed with high precision depending on the width of the front end portion 11A. Concretely, when the width W1 of the front end portion 11A is about 0.3 μm, the main magnetic pole layer 11 can be formed with high precision by using only the photoresist pattern 41. However, when the width W1 is smaller than 0.2 μm, the main magnetic pole layer 11 cannot be formed with high precision only by using the photoresist pattern 41, and it is necessary to also use ion milling.

Figure 15:
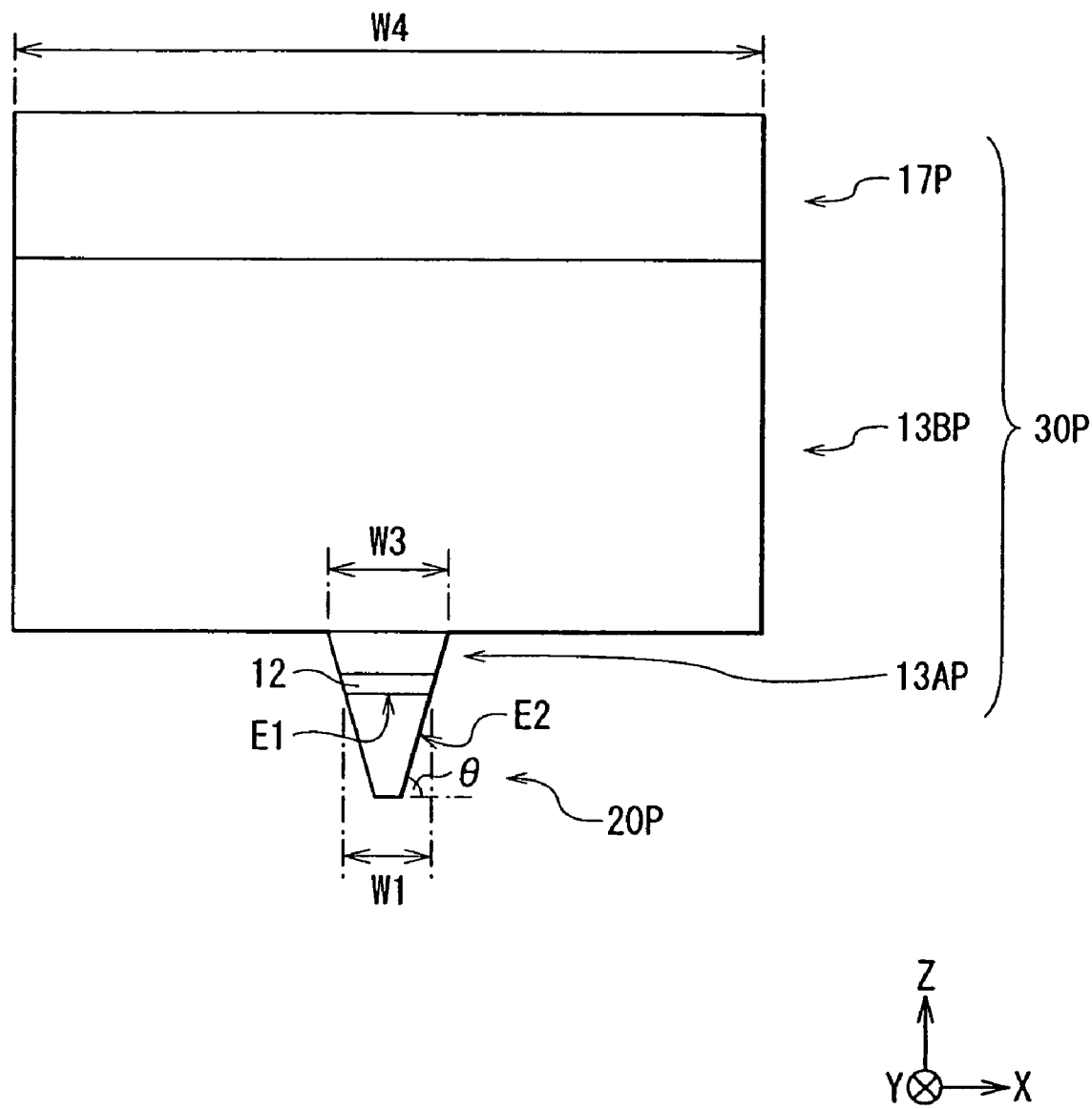
FIG. 15 is a plan view showing a modification of the configuration of the thin film magnetic head according to the embodiment of the invention.
Figure 16:
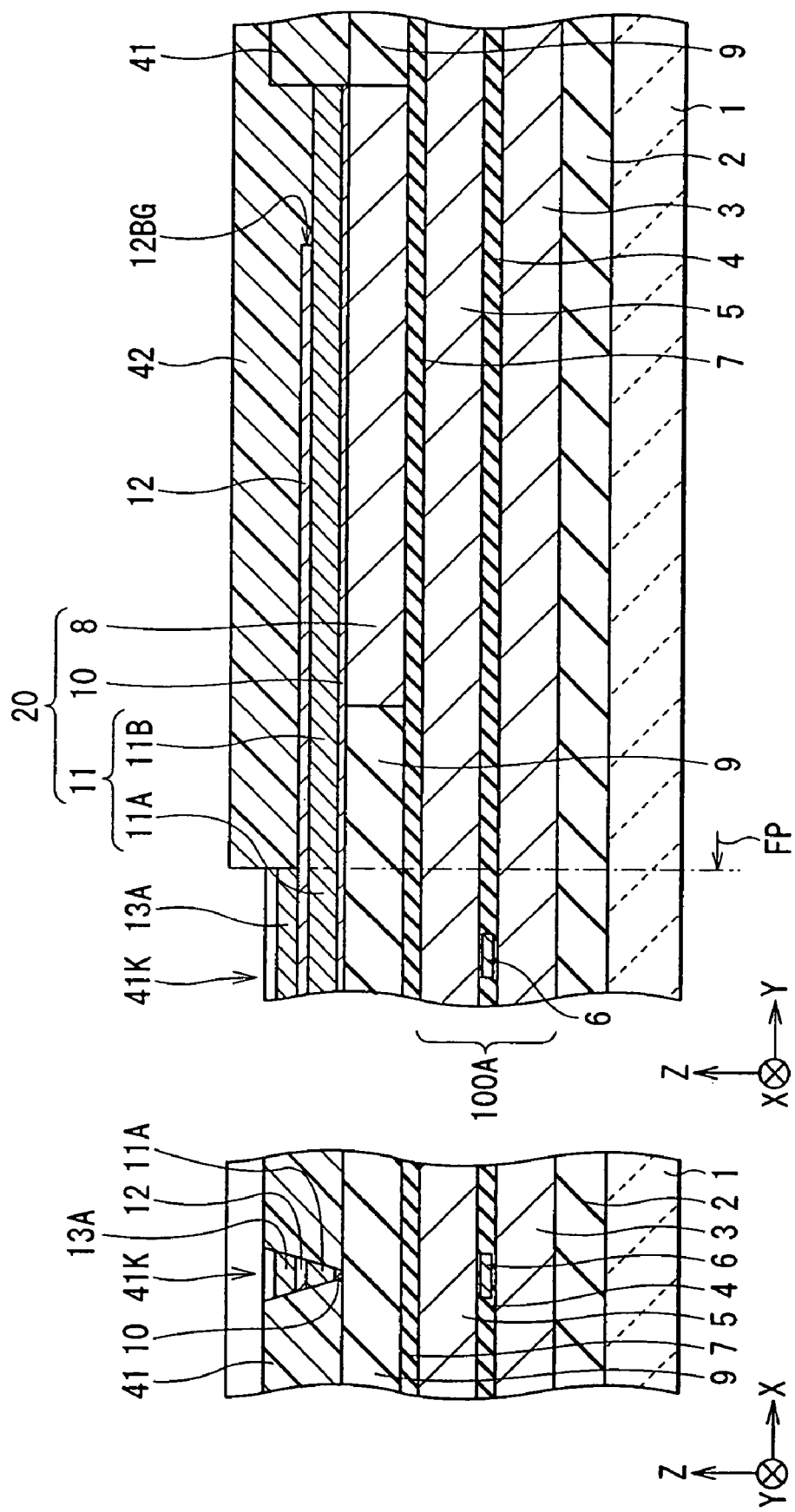
FIGS. 16A and 16B are cross sections for explaining a process of manufacturing the thin film magnetic head shown in FIG. 15.

In the embodiment, as shown in FIG. 3, both of the width W3 of the exposed surface 13AP and the width W1 of the exposed surface 20P are uniform irrespective of the positions, and the width W3 is equal to the width W1. The invention, however, is not limited to the widths. For example, as long as the action based on prevention of spread of the magnetic flux J described with reference to FIG. 13 is obtained, the width W3 of the exposed surface 13AP and the width W1 of the exposed surface 20P can be freely changed. Concretely, for example, as shown in FIG. 15, both of the width W3 of the exposed surface 13AP and the width W1 of the exposed surface 20P may vary according to positions. To be specific, each of the width W3 and W1 may gradually increase toward the trailing side and the width W3 may be larger than the width W1. In this case, for example, to prevent that the width W3 becomes larger than the width W1 and the action based on prevention of spread of the magnetic flux J described with reference to FIG. 13 cannot be obtained, preferably, the angle θ between an edge E2 of the exposed surface 20P and an plane extended from the magnetic pole layer 20 (plane including the X and Y axes) lies within a range from 70° and less than 90°. The exposed surfaces 13AP and 20P shown in FIG. 15 can be formed by, for example, as shown in FIGS. 16A and 16B, adjusting exposure parameters at the time of performing the photolithography process for forming the photoresist pattern 41, forming the photoresist pattern 41 so that the width of the opening region 41K gradually increases from down to top, and forming the main magnetic pole layer 11, gap layer 12, and lower TH specifying part 13A by using the photoresist pattern 41.

Figure 17:
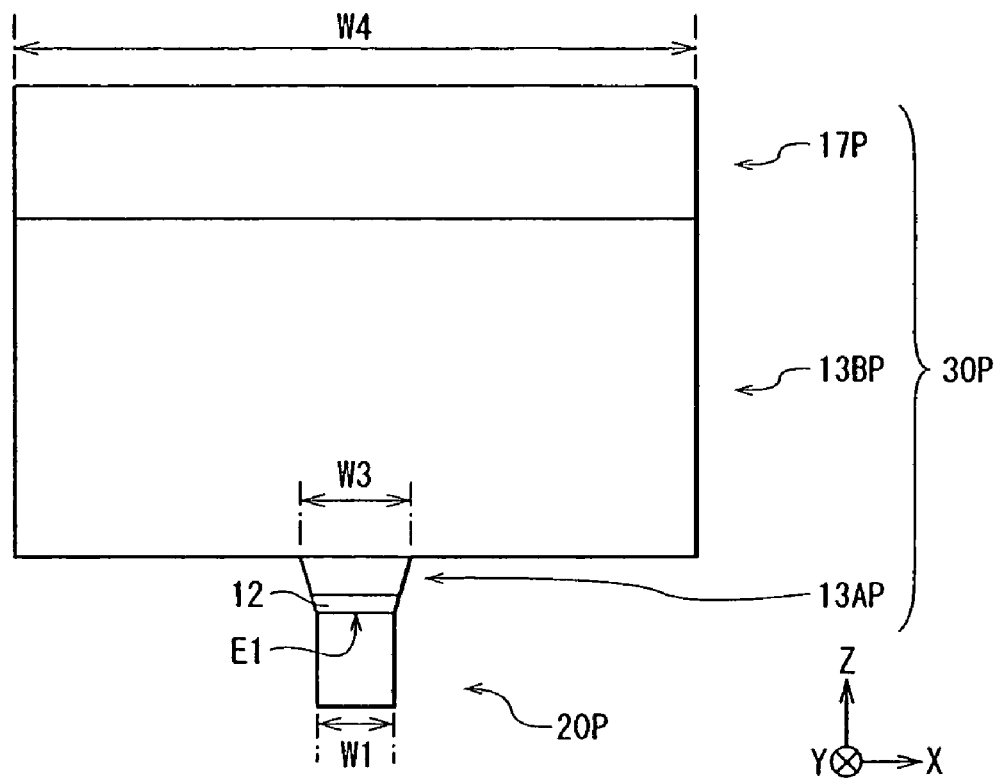
FIG. 17 is a plan view showing another modification of the configuration of the thin film magnetic head according to the embodiment of the invention.
Figure 18:
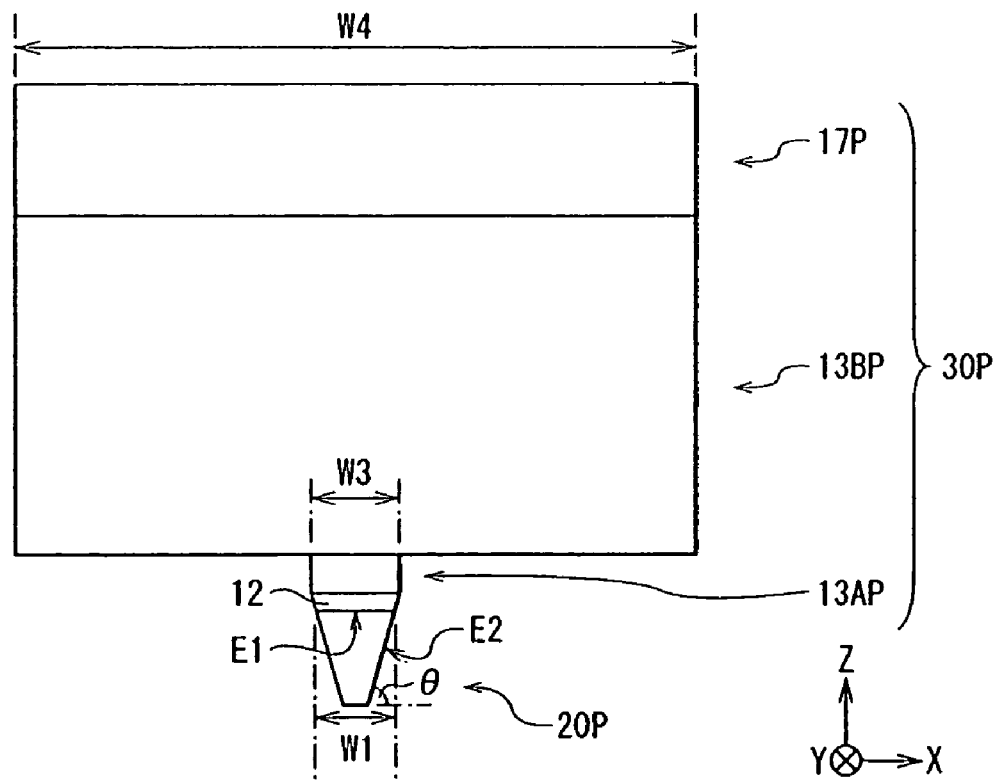
FIG. 18 is a plan view showing further another modification of the configuration of the thin film magnetic head according to the embodiment of the invention.

The widths are not limited to the case of FIG. 15. For example, as shown in FIG. 17, the width W3 of the exposed surface 13AP may vary according to a position and the width W1 of the exposed surface 20P may be uniform irrespective of a position. Alternately, as shown in FIG. 18, the width W3 of the exposed surface 13AP may be uniform irrespective of a position and the width W1 of the exposed surface 20P may vary according to a position. In any of the cases shown in FIGS. 15, 17, and 18, in a manner similar to the case shown in FIG. 3 in the embodiment, the recording magnetic field gradient can be sharpened as much as possible and the recording performance can be improved. Characteristics other than the above characteristics regarding the configuration of the thin film magnetic heads shown in FIGS. 15, 17, and 18 are similar to those in the case shown in FIG. 3.

Figure 19:
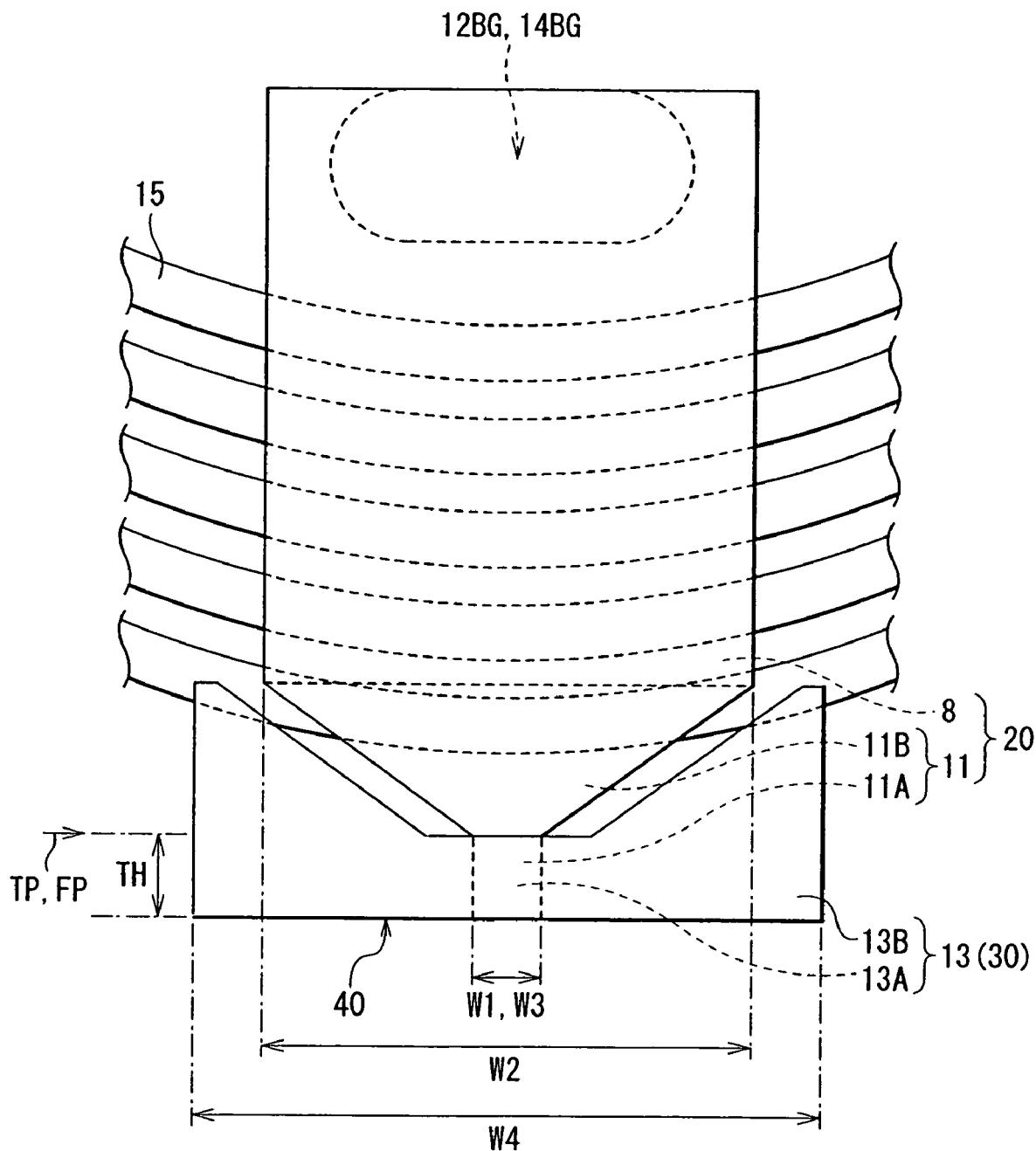
FIG. 19 is a plan view showing further another modification of the configuration of the thin film magnetic head according to the embodiment of the invention.

In the embodiment, as shown in FIG. 2, the upper TH specifying part 13B has a rectangular plane shape. The invention is not limited to the shape. As long as the upper TH specifying part 13B can function as a main inflow port of the return magnetic flux, the plane shape of the upper TH specifying part 13B can be freely changed. Concretely, for example, as shown in FIG. 19, the upper TH specifying part 13B may have an almost U shape in plan view in which both wings extend rearward close to the rear end portion 11B of the main magnetic pole layer 11. In this case, when the magnetic flux flowing in the main magnetic pole layer 11 is converged at the flare point FP and concentrated in a portion near the flare point FP of the rear end portion 11B, excessive magnetic flux which cannot flow from the rear end portion 11B to the front end portion 11A tends to flow in the upper TH specifying part 13B. The excessive magnetic flux does not pass through the front end portion 11A and is not easily emitted to the air bearing surface 40. Therefore, the invention can suppress an inconvenience which occurs when the excessive magnetic flux concentrated on the rear end portion 11B is emitted to the air bearing surface 40, that is, an inconvenience (side erase) that information recorded in an adjacent track (track adjacent to a track to be recorded) is unintentionally overwritten due to an unnecessary magnetic flux emitted to the air bearing surface 40. In FIG. 19, the yoke portion 17 is not shown so that the upper TH specifying part 13B can be easily seen.

In the embodiment, the rear end position of the upper TH specifying part 13B is set so as to coincide with the rear end position of the lower TH specifying part 13A. The invention, however, is not limited to the arrangement. For example, the rear end position of the upper TH specifying part 13B may be deviated in the longitudinal direction from the rear end position of the lower TH specifying part 13A. In this case as well, the front end position of the insulating layer 14 is specified on the basis of the rear end position of the lower TH specifying part 13A, so that the throat height zero position TP can be stably determined by using the lower TH specifying part 13A.

The thin film magnetic head according to the embodiment of the invention has been described above.

Figure 20:
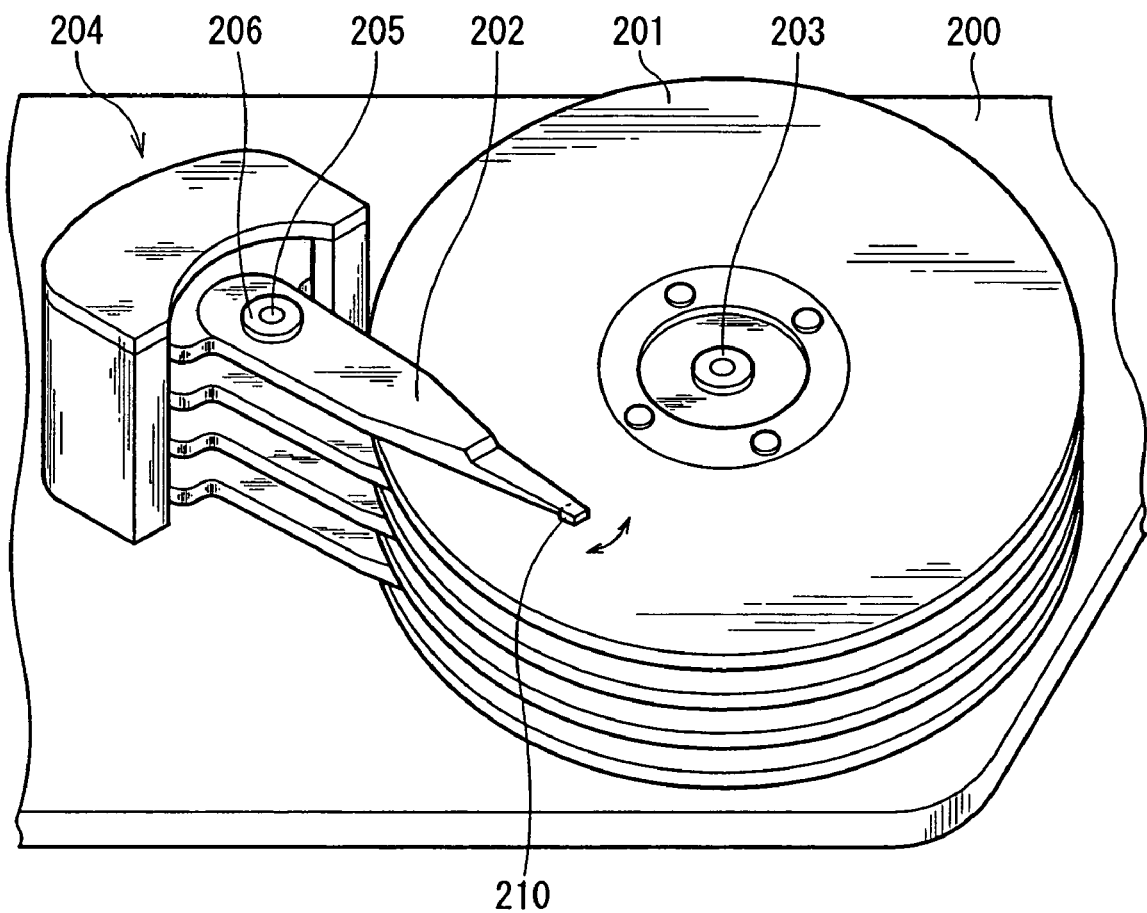
FIG. 20 is a perspective view showing a cutaway appearance configuration of the magnetic recording apparatus in which the thin film magnetic head of the invention is mounted.
Figure 21:
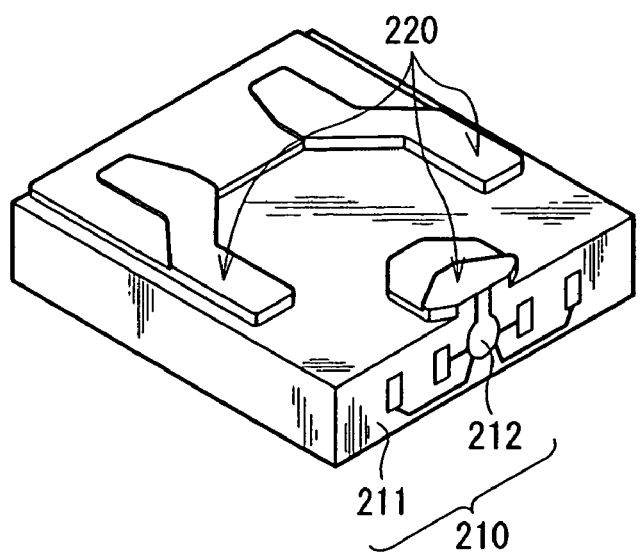
FIG. 21 is an enlarged perspective view of the appearance configuration of main components of the magnetic recording apparatus shown in FIG. 20.

Next, with reference to FIGS. 20 and 21, the configuration of a magnetic recording apparatus on which the thin film magnetic head of the invention is mounted will be described. FIG. 20 shows a cutaway configuration of the magnetic recording apparatus. FIG. 21 shows an enlarged configuration of main components of the magnetic recording apparatus. The magnetic recording apparatus is an apparatus in which the thin film magnetic head described in the foregoing embodiment is mounted and is, for example, a hard disk drive.

The magnetic recording apparatus has, as shown in FIG. 20, for example in a casing 200, a plurality of magnetic disks 201 as recording media on which information is recorded and a plurality of arms 202 disposed in correspondence with the magnetic disks 201 in a one-to-one manner, each having a tip to which a head slider 210 is attached. The magnetic disk 201 is rotatable around a spindle motor 203 fixed to the casing 200 as a center. The arms 202 are connected to a driving unit 204 as a power source and are swingable via a bearing 206 around a fixed axis 205 fixed to the casing 200 as a center. FIG. 20 shows a model in which the plurality of arms 202 integrally swing around the fixed axis 205 as a center.

The head slider 210 has a configuration such that, as shown in FIG. 21, a thin film magnetic head 212 of the perpendicular recording method is disposed in a side face orthogonal to an air bearing surface 220 (front side in FIG. 21) in a base body 211 having an almost rectangular parallelepiped shape including projections and depressions to decrease air resistance which occurs when the arm 202 swings. The thin film magnetic head 212 has, for example, the configuration described in the foregoing embodiment. FIG. 21 shows the upside down state of FIG. 20 so that the structure on the air bearing surface 220 side of the head slider 210 can be seen well.

Since the detailed configuration of the thin film magnetic head 212 has been already described specifically in the foregoing embodiment, the description will not be repeated here.

In the magnetic recording apparatus, at the time of recording information, by swing of the arm 202, the head slider 210 moves to a predetermined region (recording region) in the magnetic disk 201. When current is passed to the thin film magnetic head 212 in a state where the thin film magnetic head 212 faces the magnetic disk 201, by the operation described in the foregoing embodiment, the thin film magnetic head 212 records information onto the magnetic disk 201.

Since the magnetic recording apparatus has the thin film magnetic head 212 of the invention, as described above in the foregoing embodiment with reference to FIG. 13, spread of the magnetic flux at the time of recording is suppressed. Therefore, the recording magnetic field gradient can be sharpened as much as possible, and recording performance can be improved.

The other action, effects, deformation, and the like of the magnetic recording apparatus are similar to those of the foregoing embodiment, so that their description will not be repeated.

EXAMPLE

An example of the invention will now be described.

The recording magnetic field gradient of the thin film magnetic head described above in the foregoing embodiment (herein below, simply referred to as "thin film magnetic head of the invention") was examined and the result shown in FIG. 22 was obtained. At the time of examining the recording magnetic field gradient of the thin film magnetic head of the invention, to compare the performances, the recording magnetic field gradient of the thin film magnetic head of the comparative example shown in FIG. 14 was also examined.

Figure 22:
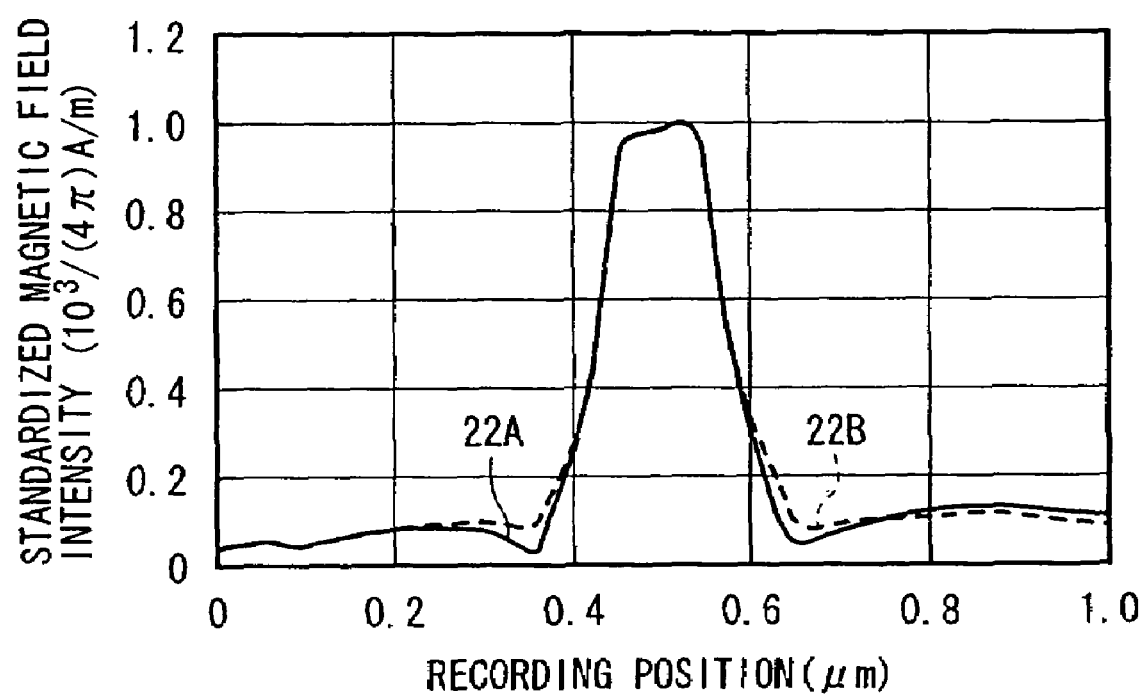
FIG. 22 is a diagram showing dependency on a recording position of recording magnetic field intensity.

FIG. 22 shows dependency on a recording position of the recording magnetic field intensity. The "horizontal axis" denotes a recording position ($\mu$m), that is, a position in the cross track direction on a recording medium (direction crossing a plurality of tracks formed on the recording medium). The "vertical axis" denotes standardized recording magnetic field intensity (standardized magnetic field intensity of $10^3/(4\pi)$A/m) for comparison. In a recording position in the horizontal axis, 0.5 $\mu$m position corresponds to the center position of a track to be recorded. "22A (solid line)" shown in FIG. 22 indicates the thin film magnetic head of the invention. "22B (broken line)" indicates the thin film magnetic head of a comparison example.

As understood from the result shown in FIG. 22, the standardized magnetic field intensity indicates the peak in the center position of the track to be recorded and gradually decreases with distance from the position. When the thin film magnetic head (22A) of the invention and the thin film magnetic head (22B) of the comparative example are compared with each other, the standardized magnetic field intensity around the track to be recorded decreases in the present invention more than the comparative example. Consequently, it was recognized that the recording magnetic field gradient is sharpened more in the thin film magnetic head of the invention.

Although the invention has been described by the embodiment and the example, the invention is not limited to the embodiment and example but can be variously modified.

Concretely, for example, in the embodiment and the example, the case of applying the invention to a single magnetic pole head has been described. The invention is not limited to the case but may be applied to a ring-shaped head. Although the case of applying the invention to a composite thin film magnetic head has been described in the foregoing embodiment, the invention is not limited to the case. The invention can be also applied to, for example, a thin film magnetic head dedicated to recording having an inductive magnetic transducer for writing and a thin film magnetic head having an inductive magnetic transducer for recording and reproducing. Obviously, the invention can be also applied to a thin film magnetic head having a structure in which a device for writing and a device for reading are stacked in the order opposite to that of the thin film magnetic head of the embodiment.

As described above, the thin film magnetic head or the magnetic recording apparatus according to the invention has the sub-return magnetic pole layer disposed on the side of the medium travel direction of the magnetic pole layer, and a part corresponding to the uniform-width portion in the sub-return magnetic pole layer is projected toward the uniform-width portion and is in contact with the gap layer. Consequently, spread of the magnetic flux is suppressed due to the existence of the projected portion when the magnetic flux emitted from the uniform-width portion to the outside at the time of recording flows in the sub-return magnetic pole layer. Therefore, the recording magnetic field gradient can be sharpened as much as possible and recording performance can be improved.

The thin film magnetic head or the magnetic recording apparatus according to the invention has the sub-return magnetic pole layer disposed on the side of the medium travel direction of the magnetic pole layer, and width of the first sub-return magnetic pole end surface in the first sub-return magnetic pole layer portion in the sub-return magnetic pole layer is equal to or larger than width of the magnetic pole end surface of the magnetic pole layer and is less than width of the second sub-return magnetic pole end surface of the second sub-return magnetic pole layer portion. Consequently, on the basis of the relation between the width of the magnetic pole end surface, the width of the first sub-return magnetic pole end surface, and the width of the second sub-return magnetic pole end surface, spread of the magnetic flux is suppressed when the magnetic flux emitted from the uniform-width portion flows in the sub-return magnetic pole layer at the time of recording. Therefore, the recording magnetic field gradient can be sharpened as much as possible and recording performance can be improved.

In the method of manufacturing a thin film magnetic head of the invention, to manufacture the thin film magnetic head having the characteristic configuration including the sub-return magnetic pole layer (including the first and second sub-return magnetic pole layer portions) disposed on the side of the medium travel direction of the magnetic pole layer, only the existing manufacturing processes including the film forming process and the patterning process are used and a new manufacturing process is not used. Therefore, the thin film magnetic head of the invention realizing improved recording performance by sharpening the recording magnetic field gradient as much as possible can be manufactured stably and easily.

In addition to the above, in the thin film magnetic head of the invention, by setting the width of the second sub-return magnetic pole end surface to be ten times or more as large as the width of the first sub-return magnetic pole end surface, while effectively preventing spread of the magnetic flux by using the first sub-return magnetic pole end surface, the magnetic flux can be sufficiently flowed into the sub-return magnetic pole layer by using the second sub-return magnetic pole end surface. Therefore, the invention can contribute to improvement in recording performance also from this viewpoint.

In the thin film magnetic head of the invention, by setting the saturated magnetic flux density of the first sub-return magnetic pole layer portion to be equal to or lower than the saturated magnetic flux density of the uniform-width portion, for example, by setting the saturated magnetic flux density of the first sub-return magnetic pole layer portion to be equal to the saturated magnetic flux density of the uniform-width portion, the flow of the magnetic flux from the uniform-width portion to the sub-return magnetic pole layer is made smooth, and the magnetic flux flowed into the sub-return magnetic pole layer can be prevented from being saturated. Therefore, the invention can contribute to improvement in the recording performance also from this viewpoint.

In the method of manufacturing the thin film magnetic head of the invention, by using one seed layer to form the magnetic pole layer, the gap layer, and the first sub-return magnetic pole layer portion, it is unnecessary to form a seed layer for each of the magnetic pole layer, gap layer, and first sub-return magnetic pole layer portion. Therefore, also from the viewpoint, the invention can contribute to facilitate manufacturing of the thin film magnetic head.

In the method of manufacturing the thin film magnetic head of the invention, the first photoresist pattern is formed by using a positive photoresist and, after that, the second photoresist pattern is formed by using a negative photoresist. Therefore, by using the first photoresist pattern and/or the second photoresist pattern, the magnetic pole layer, gap layer, and first sub-return magnetic pole layer portion can be formed stably and easily.

In the method of manufacturing the thin film magnetic head of the invention, by specifying a front end position of the insulating layer on the basis of a rear end position of the first sub-return magnetic pole layer portion, the throat height zero position can be stably determined by using the first sub-return magnetic pole layer portion.

In the method of manufacturing a thin film magnetic head of the invention, final thickness of the first sub-return magnetic pole layer portion is determined on the basis of a polishing amount of the insulating layer. For example, if the initial thickness of the first sub-return magnetic pole layer portion is at a degree that it can be controlled by using the polishing process (for example, 0.2 μm or more), the final thickness of the first sub-return magnetic pole layer portion can be freely controlled by using the polishing process.

In the method of manufacturing the thin film magnetic head of the invention, by narrowing the uniform-width portion in the magnetic pole layer by etching the uniform-width portion from a width direction, as compared with the case of forming the magnetic pole layer by using only the first photoresist pattern, the magnetic pole layer having the uniform-width portion which is narrowed extremely can be formed with high precision.

Obviously many modifications and variations of the present invention are possible in the light of the above teachings. It is therefore to be understood that within the scope of the appended claims, the invention may be practiced otherwise than as specifically described.

What is claimed is:

1. A thin film magnetic head comprising:
a magnetic pole layer to emit magnetic flux toward the recording medium, having a uniform-width portion which extends rearward from a recording-medium-facing surface which faces a recording medium traveling in a medium travel direction while maintaining a uniform width;

a main return magnetic pole layer to return the magnetic flux emitted by the magnetic pole layer, which extends rearward from the recording-medium-facing surface on the side of the medium travel direction of the magnetic pole layer and is coupled to the magnetic pole layer in its rear end region; and a sub-return magnetic pole layer, comprising a first upper portion and a second lower portion, which is isolated from the magnetic pole layer by a gap layer, is coupled to the main return magnetic pole layer, and extends from the recording-medium-facing surface to a predetermined rearward position in a region between the gap layer and the main return magnetic pole layer, wherein a portion corresponding to the uniform-width portion in the sub-return magnetic pole layer is projected toward the uniform-width portion and is in contact with the gap layer, and wherein the orientation of a signal magnetic field is set to a direction orthogonal to a surface of the recording medium, and further wherein a saturated magnetic flux density of the first upper portion is less than or equal to a saturated magnetic flux density of the second lower portion.

2. A thin film magnetic head comprising:

a magnetic pole layer to emit magnetic flux toward the recording medium, including a uniform-width portion which extends rearward from a recording-medium-facing surface which faces a recording medium traveling in a medium travel direction while maintaining a uniform width;

a main return magnetic pole layer to return the magnetic flux emitted by the magnetic pole layer, which extends rearward from the recording-medium-facing surface on the side of the medium travel direction of the magnetic pole layer and is coupled to the magnetic pole layer in its rear end region; and a sub-return magnetic pole layer which is isolated from the magnetic pole layer by a gap layer, is coupled to the main return magnetic pole layer, and extends from the recording-medium-facing surface to a predetermined rearward position in a region between the gap layer and the main return magnetic pole layer, wherein the uniform-width portion has a magnetic pole end surface exposed in the recording-medium-facing surface, the sub-return magnetic pole layer has a configuration in which a first sub-return magnetic pole layer portion having a first sub-return magnetic pole end surface exposed in the recording-medium-facing surface and a second sub-return magnetic pole layer portion having a second sub-return magnetic pole end surface exposed in the recording medium facing surface are stacked in order from the side close to the uniform-width portion, and width of the first sub-return magnetic pole end surface is equal to or larger than width of the magnetic pole end surface and is less than width of the second sub-return magnetic pole end surface and wherein the orientation of a signal magnetic field is set to a direction orthogonal to a surface of the recording medium.

3. A thin film magnetic head according to claim 2, wherein width of the second sub-return magnetic pole end surface is ten times or more as large as that of the first sub-return magnetic pole end surface.

4. A thin film magnetic head according to claim 2, wherein thickness of the gap layer is 0.2 µm or less.

5. A thin film magnetic head according to claim 2, wherein width of an edge on the side of the medium travel direction of the magnetic pole end surface is 0.3 µm or less.

6. A thin film magnetic head according to claim 2, wherein width of at least one of the magnetic pole end surface and the first sub-return magnetic pole end surface is uniform irrespective of positions.

7. A thin film magnetic head according to claim 2, wherein width of at least one of the magnetic pole end surface and the first sub-return magnetic pole end surface varies according to a position.

8. A method of manufacturing a thin film magnetic head comprising:

a magnetic pole layer to emit magnetic flux toward the recording medium, having a uniform-width portion which extends rearward from a recording-medium-facing surface which faces a recording medium traveling in a medium travel direction while maintaining a uniform width;

a main return magnetic pole layer to return the magnetic flux emitted by the magnetic pole layer, which extends rearward from the recording-medium-facing surface on the side of the medium travel direction of the magnetic pole layer and is coupled to the magnetic pole layer in its rear end region; and a sub-return magnetic pole layer, comprising a first upper portion and a second lower portion, which is isolated from the magnetic pole layer by a gap layer, is coupled to the main return magnetic pole layer, and extends from the recording-medium-facing surface to a predetermined rearward position in a region between the gap layer and the main return magnetic pole layer, wherein a portion corresponding to the uniform-width portion in the sub-return magnetic pole layer is projected toward the uniform-width portion and is in contact with the gap layer, and wherein the orientation of a signal magnetic field is set to a direction orthogonal to a surface of the recording medium, and further wherein a saturated magnetic flux density of the first upper portion is less than or equal to a saturated magnetic flux density of the second lower portion.

9. A magnetic recording apparatus comprising a recording medium and a thin film magnetic head for magnetically recording information onto the recording medium, the thin film magnetic head comprising:

a magnetic pole layer to emit magnetic flux toward the recording medium, having a uniform-width portion which extends from a recording-medium-facing surface which faces a recording medium traveling in a medium travel direction while maintaining a uniform width;

a main return magnetic pole layer to return the magnetic flux emitted by the magnetic pole layer, which extends rearward from the recording-medium-facing surface on the side of the medium travel direction of the magnetic pole layer and is coupled to the magnetic pole layer in its rear end region; and a sub-return magnetic pole layer, comprising a first upper portion and a second lower portion, which is isolated from the magnetic pole layer by a gap layer, is coupled to the main return magnetic pole layer, and extends from the recording-medium-facing surface to a predetermined rearward position in a region between the gap layer and the main return magnetic pole layer, wherein a portion corresponding to the uniform-width portion in the sub-return magnetic pole layer is projected toward the uniform-width portion and is in contact with the gap layer, and wherein the orientation of a signal magnetic field is set to a direction orthogonal to a surface of the recording medium, and further wherein a saturated magnetic flux density of the first upper portion is less than or equal to a saturated magnetic flux density of the second lower portion.

10. A magnetic recording apparatus comprising a recording medium and a thin film magnetic head for magnetically recording information onto the recording medium, the thin film magnetic head comprising:

a magnetic pole layer to emit magnetic flux toward the recording medium, having a uniform-width portion which extends rearward from a recording-medium-facing surface which faces a recording medium traveling in a medium travel direction while maintaining a uniform width;

a main return magnetic pole layer to return the magnetic flux emitted by the magnetic pole layer, which extends rearward from the recording-medium-facing surface on the side of the medium travel direction of the magnetic pole layer and is coupled to the magnetic pole layer in its rear end region; and a sub-return magnetic pole layer which is isolated from the magnetic pole layer by a gap layer, is coupled to the main return magnetic pole layer, and extends from the recording-medium-facing surface to a predetermined rearward position in a region between the gap layer and the main return magnetic pole layer, wherein the uniform-width portion has a magnetic pole end surface exposed in the recording-medium-facing surface, the sub-return magnetic pole layer has a configuration in which a first sub-return magnetic pole layer portion having a first sub-return magnetic pole end surface exposed in the recording-medium-facing surface and a second sub-return magnetic pole layer portion having a second sub-return magnetic pole end surface exposed in the recording-medium-facing surface are stacked in order from the side close to the uniform-width portion, and width of the first sub-return magnetic pole end surface is equal to or larger than width of the magnetic pole end surface and is less than width of the second sub-return magnetic pole end surface and wherein the orientation of a signal magnetic field is set to a direction orthogonal to a surface of the recording medium.

11. A thin film magnetic head comprising:

a magnetic pole layer including a uniform-width portion which extends rearward from a recording-medium-facing surface which faces a recording medium traveling in a medium travel direction while maintaining a uniform width;

a main return magnetic pole layer which extends rearward from the recording-medium-facing surface on the side of the medium travel direction of the magnetic pole layer and is coupled to the magnetic pole layer in its rear end region; and a sub-return magnetic pole layer which is isolated from the magnetic pole layer by a gap layer, is coupled to the main return magnetic pole layer, and extends from the recording-medium-facing surface to a predetermined rearward position in a region between the gap layer and the main return magnetic pole layer, wherein the uniform-width portion has a magnetic pole end surface exposed in the recording-medium-facing surface, the sub-return magnetic pole layer has a configuration in which a first sub-return magnetic pole layer portion having a first sub-return magnetic pole end surface exposed in the recording-medium-facing surface and a second sub-return magnetic pole layer portion having a second sub-return magnetic pole end surface exposed in the recording medium facing surface are stacked in order from the side close to the uniform-width portion, and width of the first sub-return magnetic pole end surface is equal to or larger than width of the magnetic pole end surface and is less than width of the second sub-return magnetic pole end surface wherein saturated magnetic flux density of the first sub-return magnetic pole layer portion is equal to or less than saturated magnetic flux density of the uniform-width portion and saturated magnetic flux density of the second sub-return magnetic pole layer portion is equal to or less than saturated magnetic flux density of the first sub-return magnetic pole layer portion.

12. A thin film magnetic head according to claim 11, wherein the magnetic pole layer is constructed to emit a magnetic flux for magnetizing the recording medium in a direction orthogonal to the surface of the recording medium.

* * * * *